US012703478B2

(12) United States Patent
Plecnik et al.

(10) Patent No.: US 12,703,478 B2
(45) Date of Patent: Aug. 11, 2026

(54) DEPLOYABLE WINGS FOR AN AIRCRAFT

(71) Applicants: University of Notre Dame du Lac, South Bend, IN (US); United States Air Force Research Laboratory, Wright-Patterson AFB, OH (US)

(72) Inventors: Mark Plecnik, South Bend, IN (US); Sam Patrick O'Connor, South Bend, IN (US); Aravind Baskar, South Bend, IN (US); James Joo, Dayton, OH (US)

(73) Assignees: University of Notre Dame du Lac, South Bend, IN (US); Government of the United States as Represented by the Secretary of The Air Force, Wright-Patterson AFB, OH (US)

( * ) Notice: Subject to any disclaimer, the term of this patent is extended or adjusted under 35 U.S.C. 154(b) by 0 days.

(21) Appl. No.: 19/058,597

(22) Filed: Feb. 20, 2025

(65) Prior Publication Data

US 2025/0289560 A1 Sep. 18, 2025

Related U.S. Application Data

(60) Provisional application No. 63/555,696, filed on Feb. 20, 2024.

(51) Int. Cl.
*B64C 3/56* (2006.01)

(52) U.S. Cl.
CPC .................................... *B64C 3/56* (2013.01)

(58) Field of Classification Search
CPC ........... B64C 3/56; B64C 11/28; B64C 27/50; B64U 20/50; B64U 30/293
See application file for complete search history.

(56) References Cited

U.S. PATENT DOCUMENTS

| | | | | |
|---|---|---|---|---|
| 8,304,703 B2 * | 11/2012 | Hong | ...................... | F42B 10/18 244/49 |
| 12,202,600 B1 * | 1/2025 | Foskey | ..................... | B64C 3/56 |

(Continued)

OTHER PUBLICATIONS

Alizade, Rasim and Gezgin, Erkin. "Synthesis of Function Generating Spherical Four Bar Mechanism for the Six Independent Parameters." Mechanism and Machine Theory vol. 46 No. 9 (2011): pp. 1316-1326. DOI 10.1016/j.mechmachtheory.2011.04.002.

(Continued)

*Primary Examiner* — Rodney A Bonnette
(74) *Attorney, Agent, or Firm* — Greenberg Traurig, LLP

(57) ABSTRACT

An apparatus for deploying the wings of a movable-wing aircraft includes a spherical four-bar mechanism. The spherical four-bar mechanism has a first bar to which a first wing is attached, a second bar to which a second wing is attached, a third, movable bar rotatably or movably linking the first bar to the second bar at a first respective point on each bar, and a fourth bar grounding the first and second bar at a second respective point on each bar. The spherical four-bar mechanism may be mathematically optimized for space, size, and movement by a system of kinematic equations to allow the first and second wing to open at substantially the same time without colliding with one another. The wings of the aircraft may further include a mid-wing hinge with a movable stiffening spar to allow the wings to fold to a more compact size during storage.

20 Claims, 18 Drawing Sheets

(56) References Cited

U.S. PATENT DOCUMENTS

| | | | | |
|---|---|---|---|---|
| 2012/0280080 | A1* | 11/2012 | Lubenow | B64U 10/25 244/49 |
| 2020/0079492 | A1* | 3/2020 | Noskowicz | B64U 10/25 |
| 2024/0182154 | A1* | 6/2024 | Gleason-Chapell | B64C 3/56 |

OTHER PUBLICATIONS

Alizade, Rasim I. and Kilit, Özgür. "Analytical Synthesis of Function Generating Spherical Four-Bar Mechanism for the Five Precision Points." Mechanism and Machine Theory vol. 40 No. 7 (2005): pp. 863-878. DOI.1016/j.mechmachtheory.2004.12.010.
Baskar, Aravind and Plecnik, Mark. "Synthesis of Six-bar Timed Curve Generators of Stephenson-type Using Random Monodromy Loops." Journal of Mechanisms and Robotics vol. 13 No. 1 (2020). DOI 10.1115/1.4047871.
Baskar, Aravind, Plecnik, Mark and Hauenstein, Jonathan D. "Computing Saddle Graphs via Homotopy Continuation for the Approximate Synthesis of Mechanisms." Mechanism and Machine Theory vol. 176 (2022): p. 104932. DOI 10.1016/j.mechmachtheory.2022.104932.
Bates, Daniel J., Hauenstein, Jonathan D., Sommese, Andrew J. and Wampler, Charles W. "Bertini: Software for Numerical Algebraic Geometry" (2006). DOI 10.7274/R0H41PB5.
Cervantes-Sánchez, J. Jesús, Gracia, Luis, Rico-Martínez, José M., Medellín-Castillo, Hugo I. and González-Galván, Emilio J. "A Novel and Efficient Kinematic Synthesis Approach of the Spherical 4R Function Generator for Five and Six Precision Points." Mechanism and Machine Theory vol. 44 No. 11 (2009): pp. 2020-2037. DOI 10.1016/j.mechmachtheory.2009.05.006.
Farhang, K. and Zargar, Y. S. "Design of Spherical 4R Mechanisms: Function Generation for the Entire Motion Cycle." Journal of Mechanical Design vol. 121 No. 4 (1999): pp. 521-528. DOI 10.1115/1.2829492.
Freudenstein, Ferdinand. "An Analytical Approach to the Design of Four-Link Mechanisms." Transactions of the American Society of Mechanical Engineers vol. 76 No. 3 (2022): pp. 483-489. DOI 10.1115/1.4014881.
Hartenberg, Richard S. and Denavit, Jacques. Kinematic Synthesis of Linkages. McGraw-Hill, New York, Chapter 12 (1964).
Jiawei, Wang, Xiyuan, Cheng, Shiqi, Wen, Xiang, Li, Ying, Zhang and Duanling, Li. "The Algebraic Solution to the Spherical 4R Function Generator for Six Precision Points." 2019 IEEE 9th Annual International Conference on CYBER Technology in Automation, Control, and Intelligent Systems (CYBER): pp. 42-47, 2019. DOI 10.1109/CYBER46603.2019.9066669.
Lakshminarayana, K. "On the Synthesis of the Spherical Four-Bar." Mechanism and Machine Theory vol. 7 No. 1 (1972): pp. 63-69. DOI 10.1016/0094-114X(72)90017-1.
Liu, Zheng and Angeles, Jorge. "Least-Square Optimization of Planar and Spherical Four-Bar Function Generator Under Mobility Constraints." Journal of Mechanical Design vol. 114 No. 4 (1992): pp. 569-573. DOI 10.1115/1.2917045.
Morgan, Alexander P. and Sommese, Andrew "Coefficient-Parameter Polynomial Continuation." Applied Mathematics and Computation vol. 29 No. 2 (1989): pp. 123-160. DOI 10.1016/0096-3003(89)90099-4.
Rao, Singiresu S. and Ambekar, A. G. "Optimum Design of Spherical 4-R Function Generating Mechanisms." Mechanism and Machine Theoryvol. 9No. 3 (1974): pp. 405-410. DOI 10.1016/0094-114X(74)90023-8.
Roth, Bernard. "Finite-Position Theory Applied to Mechanism Synthesis." Journal of Applied Mechanics vol. 34 No. 3 (1967): pp. 599-605. DOI 10.1115/1.3607749.
Sancibrián, Ramon, de-Juan, Ana, Garcia, Pablo, Fernández, Alfonso and Viadero Rueda, Fernando. "Optimal Synthesis of Function Generating Spherical and RSSR Mechanisms." 12th IFToMM World Congress. 2007. Besançon, France.
Watanabe, Katsumi. "Approximate Synthesis of Spherical Four-Bar Mechanisms." Bulletin of JSME vol. 13 No. 58 (1970): pp. 607-615. DOI 10.1299/jsme1958.13.607.
Zimmerman, John R. "Four-Precision-Point Synthesis of the Spherical Four-Bar Function Generator." Journal of Mechanisms vol. 2 No. 2 (1967): pp. 133-139. DOI 10.1016/0022-2569(67)90035-3.

* cited by examiner

500

DEPLOYABLE WINGS FOR AN AIRCRAFT

CROSS-REFERENCE TO RELATED APPLICATIONS

The present disclosure claims priority to U.S. Provisional Application 63/555,696, filed on Feb. 20, 2024, and entitled "DEPLOYABLE WINGS FOR AN AIRCRAFT", which is incorporated herein by reference in its entirety.

STATEMENT REGARDING FEDERALLY SPONSORED RESEARCH OR DEVELOPMENT

This invention was made with government support under grant CMMI2144732 awarded by the National Science Foundation (NSF) and contract FA8650-18-C-2808 awarded by the United States Air Force. The government has certain rights in the invention.

TECHNICAL FIELD

This disclosure generally relates to aircraft, and specifically to a mechanism for the opening or deployment, folding or closing, and storage of the wings of an aircraft which are pivotally and/or rotatably mounted to the aircraft.

BACKGROUND

Some aircraft may have deployable wings which are, in a non-deployed position, stored inside or alongside the body or fuselage of an aircraft. Typically, to deploy the wings, the wings are either pivotally or rotatably mounted to the fuselage, and a mechanism or more than one mechanism rotates, pivots, or otherwise moves the wings into the deployed or functional position.

DETAILED DESCRIPTION

Figure 1B:
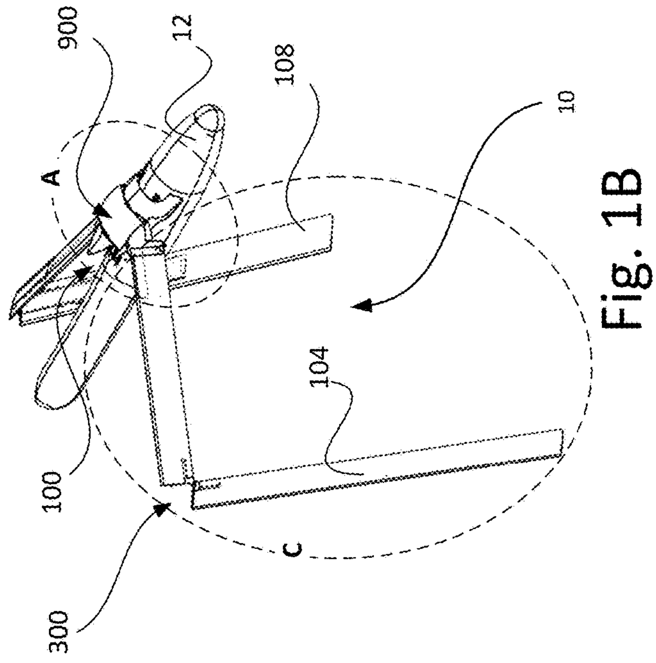
FIG. 1B illustrates a front perspective view of the example aircraft shown in FIG. 1A in a second configuration which is during deployment of the wings.

In some aircraft applications, the wings of the aircraft may be movably fastened to the aircraft such that, when not in use the wings may pivot, rotate, or otherwise move from the in-use position to a storage position inside, near, or around the fuselage of the aircraft. In some applications, the wings are movably mounted so that the aircraft can be stored in smaller spaces than traditional fixed wing aircraft. In some applications, it is advantageous to be able to "deploy," or move the wings of an aircraft from a storage position to an in-use position, during flight or "mid-flight."

In some applications, the process of installing and removing the wings of an aircraft may be a manual process completed by one or more persons. In some applications, a mechanism may be provided to pivot, rotate, or otherwise move the wings from the storage position to the in-use position. In some applications, the wings may deploy at the same or substantially the same time, such that the aircraft does not become imbalanced or experience uneven wind resistance during the deployment of the wings. One aspect of deploying aircraft wings in the manners described above is to ensure that the deployable wings of the aircraft do not collide or otherwise interfere with each other during deployment. Another aspect of deploying aircraft wings in the manners described above is to ensure that the wings are deployed in a manner that does not negatively affect the air resistance of the aircraft, and the wings are stabilized and fixed to the aircraft in the in-use position.

Reference will now be made in detail to various embodiments, examples of which are illustrated in the accompanying drawings. While this disclosure includes certain embodiments, it will be understood the disclosure is not intended to limit the claims to these embodiments. On the contrary, the disclosure is intended to cover alternatives, modifications and equivalents, which may be included within the spirit and scope of the claims. Furthermore, in this detailed description, numerous specific details are set forth in order to provide a thorough understanding. However, one of ordinary skill in the art will appreciate that the subject matter of the present disclosure may be practiced without these specific details. In other instances, well known methods, procedures, and components have not been described in detail as not to unnecessarily obscure aspects of the present disclosure.

The instant disclosure includes an apparatus for opening (or "deploying") and closing (or "storing") the wings of an aircraft with movable wings. The apparatus includes a closed-loop linkage such as a spherical four-bar linkage (or a "spherical four-bar"). A spherical four-bar is a single degree-of-freedom mechanism with four links and four joints, whose axes of rotation all intersect at a single point in space. The spherical four-bar mechanism links or constrains the movement of one wing opening with the movement of the other wing opening such that the wings open in a relationship defined by a kinematic system of equations. The apparatus thus allows for deploying and retracting wings for an aircraft in a compact and efficient manner optimized by the system of equations defining the spherical four-bar linkage, while avoiding the issue of one wing interfering with another wing during deployment. It should be understood that a spherical four-bar linkage is described herein merely as an example and that other closed-loop linkages are contemplated. For example, the linkage may be four-bar, five-bar, six-bar, seven-bar, and so on. As another example, the linkage may be spherical, planar, or spatial.

Figure 1A:
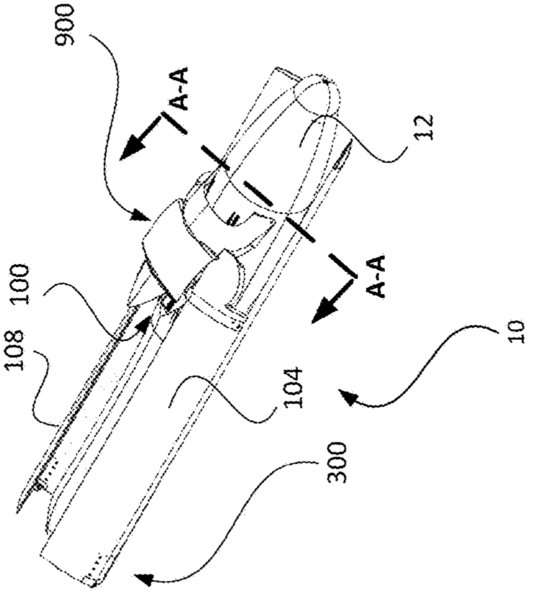
FIG. 1A illustrates a front perspective view of an example aircraft with an apparatus for deploying a pair of foldable wings of an aircraft in a first, closed configuration.
Figure 1C:
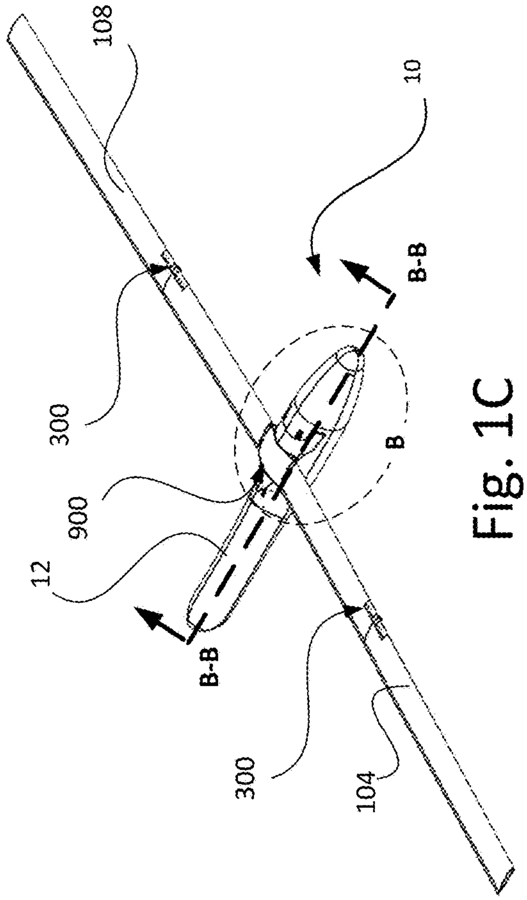
FIG. 1C illustrates a front perspective view of the example aircraft shown in FIG. 1A in a final, fully deployed configuration.

Referring now to FIGS. 1A-C, an aircraft 10 may have an apparatus 100 for deploying a first wing 104 and a second wing 108 of the aircraft 10. The apparatus 100 for deploying each of the wings 104, 108 may further contain a hinge assembly 900 (also referred to herein as a "knock-lock" or fairing clamp) for covering the apparatus 100 used to deploy the wings 104, 108, after deployment, for clamping down the wing, and to reduce the air resistance of the aircraft. Each of the wings 104, 108 of the aircraft 10 may further contain a mid-wing hinge assembly 300 which may allow for each of the wings 104, 108 to be further folded and thus reduce a required storage space necessary for the aircraft 10 when in a storage configuration.

FIG. 1A illustrates the example aircraft 10 in a first, stowed or closed configuration. As seen in FIG. 1A, the wings 104, 108 are substantially parallel to the fuselage 12 of the aircraft 10. In this example, the wings 104, 108 are also bent at the mid-wing hinge assembly 300, such that the wings 104, 108 are folded over themselves.

FIG. 1B illustrates the example aircraft 10 in a second, mid-deployment configuration. In the example shown in FIG. 1B, the apparatus 100 for deploying the wings 104, 108 may be actuated, and may cause the wings 104, 108 to begin to separate and rotate away from the fuselage 12. As illustrated, in this example the wings 104, 108 may also begin to rotate at the mid-wing hinge assembly 300 into an unfolded position and configuration.

FIG. 1C illustrates the aircraft 10 in a third, fully deployed configuration. In the example shown in FIG. 1C, the apparatus 100 full rotates each of the wings 104, 108 to a position which is substantially perpendicular to the fuselage 12 of the aircraft 10. In this example, the wings 104, 108 likewise are fully unfolded at the mid-wing hinge assembly 300 such that wings are fully extended to a furthest distance extending outwards from the fuselage 12. In addition, the example hinge assembly 900 or "knock-lock" has been actuated and is concealing the apparatus 100 and the base of each of the wings 104, 108.

Figure 2:
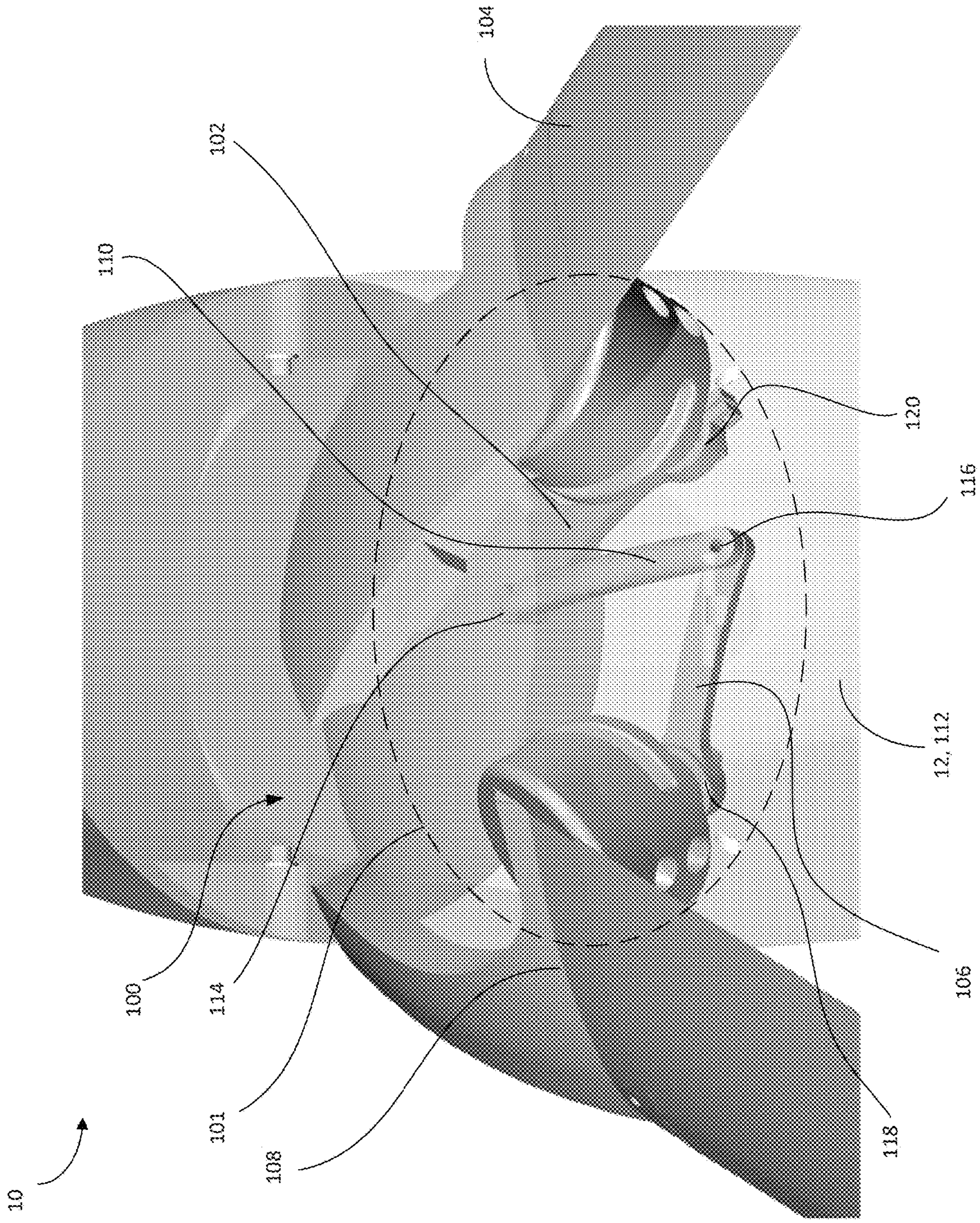
FIG. 2 illustrates a rear perspective view of the example apparatus for deploying the wings of the aircraft illustrated in FIGS. 1A-C according to Detail A from FIG. 1B.

Illustrated in FIG. 2, the example apparatus 100 for deploying the wings of an aircraft includes a spherical four-bar mechanism 101. In this example, the spherical four-bar mechanism 101 comprises a first linkage or bar (hereinafter a "first bar 102"), a first wing 104, a second linkage or bar (hereinafter a "second bar 106"), a second wing 108, a third linkage or bar (hereinafter a "third bar 110"), and a fourth linkage or bar (hereinafter a "fourth bar 112"). In the example apparatus the fourth bar 112 is a portion of the fuselage 12 of the aircraft between the first bar 102 and the second bar 106. The first bar 102 is connected (e.g., fastened) to the third bar 110, for example, by a first floating pinned joint 114, which allows for the first bar 102 to rotate relative to the third bar 110. The third bar 110 is connected (e.g., fastened) to the second bar 106, for example, by a second floating pinned joint 116, which allows for the second bar 106 to rotate relative to the third bar 110. The third bar 110 is connected (e.g., fastened) to both the first bar 102 and the second bar 106, for example, by the floating pinned joints 114, 116, allowing the third bar 110 to both rotate and translate relative to the first bar 102 and the second bar 106.

The second bar 106 is connected (e.g., fastened) to the fourth bar 112, for example, by a first fixed pinned joint 118, allowing the second bar 106 to rotate relative to the fourth bar 112 (the fuselage 12), but the second bar 106 cannot translate relative to the fourth bar 112 (the fuselage 12). The fourth bar 112 is connected (e.g., fastened) to the first bar 102, for example, by a second fixed pinned joint 120, allowing the first bar 102 to rotate relative to the fourth bar 112 (the fuselage 12), but the first bar 102 cannot translate relative to the fourth bar 112 (the fuselage 12). Thus, the first bar 102, the second bar 106, the third bar 110, and the fourth bar 112 complete a closed-loop connection between the bars (e.g., connected through a series of floating pinned joints) and their movements, or degrees of freedom, are represented through a system of kinematic equations that kinematically constrains the movement of the bars in relation to each other, for example, to prevent collisions or other mechanical interferences between the bars during opening and closing of the wings.

It should be noted that different types of connections may be made from one linkage or bar to another, and different bars or linkages may connect to one another in the series which forms the closed loop of connections among the bars or linkages.

Referring back to FIG. 1, in the example aircraft 10, the first wing 104 is fastened to the first bar 102, and the second wing 108 is fastened to the second bar 106. The first bar 102, and the second bar 106, which are both connected by the first and second fixed pin joints 118, 120 to the fourth bar 112 which is the fuselage 12 itself. Thus, the first wing 104 and the second wing 108 are free to rotate in the same manner that the first bar 102 and the second bar 106, respectively, are free to rotate. The rotation of the first bar 102 is further constrained to the rotation of the second bar 106 by each bar's respective floating pinned joint 114, 116 to the third bar 110. Therefore, the rotation of the first wing 104, by its connection to the first bar 102, is constrained to the rotation of the second wing 108, by its connection to the second bar 106. In this manner, the first wing 104 may be rotated at the same time as the second wing 108 while avoiding collision with each other, as their movement is constrained by the fixed relationship of the first bar 102 and the second bar 106 to which each wing 104, 108 is attached, and in turn each relationship of the first bar 102, and the second bar 106 to the fuselage or the fourth bar 112, and the third bar 110.

The first bar 102, the first wing 104, the second bar 106, the second wing 108, the third bar 110, and the fourth bar 112 (the fuselage 12) may all be designed to function with one another according to a system of kinematic equations that defines the operation of a spherical four-bar mechanism. The length, or size of each bar, and their connections to and spacings between each other are determined by the system of kinematic equations that defines the motion of a spherical four-bar. The system of kinematic equations may be computationally optimized to define a motion profile that describes the kinematic behavior of the wings.

The motion profile of deployable wings in an aircraft design refers to a manner in which the rotational movement of the wings is coordinated and can be described based on symmetry and/or linearity, leading to categories including symmetric, asymmetric, linear, and nonlinear.

A symmetric motion profile occurs when both wings undergo identical angular displacements over time, maintaining a mirror-image relationship about the aircraft's centerline. Conversely, an asymmetric motion profile refers to a scenario where the two wings deploy at different rates or reach their final positions at different times.

In terms of linearity, a linear motion profile is one where the wing rotation follows a constant angular velocity, meaning that the angle of deployment is a linear function of time. A nonlinear motion profile, in contrast, involves a variable angular velocity, where the rate of deployment changes as a function of time.

Optimizing the system of kinematic equations may include optimizing the geometric parameters of the spherical four-bar mechanism and wings as well as their kinematic constraints. Geometric parameters refer to the physical dimensions and spatial relationships of the components in the spherical four-bar mechanism and the wings, while kinematic constraints define the motion relationships and limitations governing the mechanism's movement.

Geometric parameters may include the lengths of the bars (also referred to as linkages or members), as these directly affect the range of motion and deployment trajectory. Additionally, the pivot locations along each bar influence the motion path, ensuring proper synchronization between the wings. The attachment points of the wings to the mechanism and/or bars may also fall under geometric parameters, as they determine how the motion of the four-bar linkage translates into wing deployment.

Kinematic constraints may include angular constraints, such as the allowable range of rotation for the second and third bars with respect to the first bar, ensuring the deployable structures do not exceed their intended operational positions. The relative motion constraint between the second and third bars, enforced by the fourth bar, may define how the input motion on one side of the mechanism translates to the other. Additionally, velocity and acceleration limits are kinematic constraints that allow for smooth motion and prevent excessive stress or instability during deployment. Other constraints may include mechanical interference avoidance, so that the deployable structures do not collide at any point during movement, and actuation constraints, which define the torque or force limits required to drive the mechanism effectively.

FIG. 2 illustrates a rear perspective view of the example apparatus for deploying the wings of the aircraft 10 according to Detail A of FIG. 1B. FIG. 2 also shows example relationships between the bars (or "linkages") in the spherical four-bar mechanism 101. The example spherical four-bar mechanism 101 has the first bar 102 (or "member"), the second bar 106 (or "member"), the third bar 110 (or "member"), and the fourth bar 112 (or "member"). In at least one example of the present disclosure, the fourth bar 112 or may be the fuselage of the aircraft 10, which remains stationary with respect to the deployment of the wings 104, 108 of the aircraft 10. The first bar 102 and the second bar 106 may be rotatably connected to the fourth bar 112, or fuselage, of the aircraft 10. In other words, the fourth bar 112 may link the first bar 102 and the second bar 106 together in a positionally fixed relationship. Therefore, the translational positions of the first bar 102 and the second bar 106 may be fixed but the first bar 102 and the second bar 106 are free to rotate. The first bar 102 and the second bar 106 are prevented from moving up and down, side to side, or in and out by way of the rotatable connection to the fourth bar 112 of the spherical four-bar mechanism 101. The example spherical four-bar mechanism 101 has the third bar 110 that is connected between the first bar 102 and the second bar 106. The third bar 110 is not fixed and can rotate. The motion of the third bar 110 may be constrained, however, by the fixed positional relationship between the first bar 102 and the second bar 106 established by the connection of each of the first bar 102 and the second bar 106 to the ground or the fourth bar 112.

Figure 3:
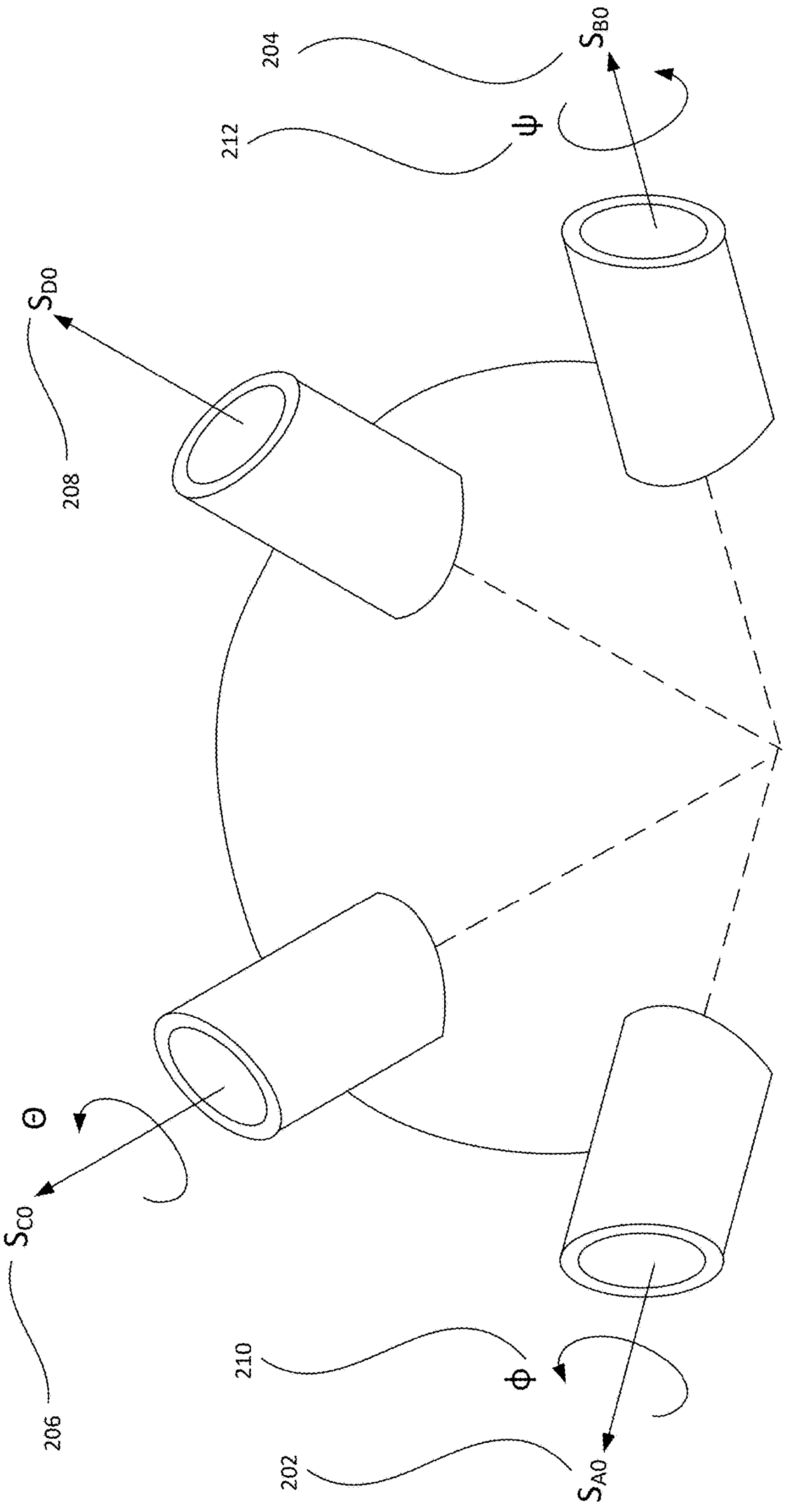
FIG. 3 illustrates an example diagram of the relationship of movements of an example spherical four-bar linkage mechanism.

As illustrated in FIG. 3, an example of the spherical four-bar mechanism 101 is specified by the location of its four joint axes in a reference configuration, such as the example configuration just described in FIG. 1. In the example, there are two "fixed" joints $S_{A0}$ 202 (the fixed-position, rotatable joint between the first bar 102 and the fourth bar 112) and $S_{B0}$ 204 (the fixed-position, rotatable joint between the second bar 106 and the fourth bar 112) and moving joints $S_{C0}$ 206 (the free-moving, non-fixed joint between the first bar 102 and the third bar 110) and $S_{D0}$ 208 (the free-moving, non-fixed joint between the second bar 106 and the third bar 110). Rotations about the ground pivot joint $S_{A0}$ 202 are parameterized by $\phi$210. Rotations about the ground pivot $S_{B0}$ 204 are parameterized by $\psi$212. Rotation matrices written in axis-angle form are notated as $[R(s, \phi)]$. A rotation of x by $\phi$ about unit vector s evaluates to:

$$[R(s, \phi)]x = x + \sin\phi s \times x + (1 - \cos\phi) s \times (s \times x)$$

A rotation of joint $S_{C0}$ 206 about $S_{A0}$ 202 yields the displaced vector:

$$S_C = [R(S_{A0}, \phi)]S_{C0}$$

where the exclusion of 0 from the subscript differentiates between the displaced and reference configurations of $S_C$ 206. Similarly, a rotation of $S_{D0}$ 208 about $S_{B0}$ 204 yields:

$$S_D = [R(S_{B0}, \psi)]S_{D0}$$

The constraint of the spherical four-bar mechanism 101 is that the relative angle between joints $S_C$ 206 and $S_D$ 208 remains constant throughout its motion, because between joints $S_C$ 206 and $S_D$ 208 is the rigid member, i.e., the third bar 110, which is further constrained by the rigid positional relationship between the fixed joints $S_{A0}$ 202 and $S_{B0}$ 204. That is to say, for every degree the joint $S_C$ 206 moves in one direction, the joint $S_D$ 208 must move that same magnitude in the opposite direction, to accommodate the constant spacing between fixed joints $S_{A0}$ 202 and $S_{B0}$ 204. Therefore, the dot product of the vectors $S_C$ 206 and $S_D$ 208 should match the dot product of the vectors $S_{C0}$ and $S_{D0}$ at the reference configuration:

$$S_C \cdot S_D = S_{C0} \cdot S_{D0}$$

And therefore, substituting in what was previously determined for $S_C$ and $S_D$:

$$[R(S_{A0}, \phi)]S_{C0} \cdot [R(S_{B0}, \psi)]S_{D0} = S_{C0} \cdot S_{D0}$$

A goal of function generation is to synthesize a mechanism that coordinates the angle pairs $(\phi_j, \psi_j)$, j=0, 1, . . . , N−1, where $\phi_j$, $\psi_j$ are the angles of the joints $S_A$ 202 between the first bar 102 and fourth bar 112 and $S_B$ 204 between the second bar 106 and fourth bar 112, and consequently the angles of the wings 104, 108 with respect to the fourth bar 112 or fuselage of the aircraft. In other words, the function can design a physical spherical four-bar mechanism, such as the example spherical four-bar mechanism 101, which moves according to a specified relationship between angles $\phi$, $\psi$ at multiple intervals j, and this can be used to deploy wings of an aircraft in a coordinated manner.

Without loss of generality to the function produced, one of the fixed axes may be specified. In the proceeding description, $S_{A0}=\{1, 0, 0\}$. A geometric plane is spanned by $S_{A0}$ & $S_{B0}$. Without loss of generality to the function produced, any geometric plane may be chosen. The plane chosen in the description that follows puts $S_{A0}$ and $S_{B0}$ into the z=0 plane. Therefore, in the following, the second fixed axis takes the form $S_{B0}=\{S_{Bx0}, S_{By0}, 0\}$. Any desired function may be shifted such that $(\phi_0, \psi_0)=(0, 0)$.

Exact synthesis for five positions is a classical approach in kinematic mechanism design, where a spherical four-bar is synthesized to match five prescribed angle pairs. The process is based on solving a system of kinematic constraint equations that enforce a correspondence between angles $\phi_0$, $\psi_0$ at five discrete positions. Given a set of five prescribed angle pairs $(\phi_0, \psi_0)$, the fundamental constraint equation for a spherical four-bar is:

$$[R(s_{A0}, \phi_j)]s_{C0} \cdot [R(s_{B0}, \psi_j)]s_{D0} = s_{C0} \cdot s_{D0}, \text{ for } j = 0, \ldots, 4.$$

While synthesis for five positions ensures that the mechanism will pass through the specified configurations, it is inherently inadequate for most practical applications because it does not account for the behavior of the mechanism outside these discrete positions. Real-world applications, such deployable aircraft wings, require smooth and controlled motion over a continuous range of angles, not just at a few exact points.

A more robust approach as defined herein is approximate synthesis, where the mechanism is designed to minimize the overall deviation from a desired function (e.g., target trajectory) rather than perfectly matching a small set of points. Approximate synthesis achieves this by defining an objective function that quantifies the error over multiple points and optimizes the mechanism parameters to minimize this error, enabling a smoother and more reliable motion profile.

The approximate kinematic synthesis of spherical four-bar function generators is formulated as a constrained optimization problem to design a mechanism that closely approximates a desired motion. Instead of enforcing exact precision at a limited number of positions, this approach minimizes an objective function that quantifies the error between the actual and desired motion over multiple discretized points.

The spherical four-bar linkage consists of four rotational joints where all joint axes intersect at a single point. The motion of the mechanism is governed by the fundamental constraint equation:

$$[R(s_{A0}, \phi_j)]s_{C0} \cdot [R(s_{B0}, \psi_j)]s_{D0} = R_{CD}$$

where $[R(S_{A0}, \phi_j)]$ and $[R(s_{B0}, \psi_j)]$ are rotation matrices about the ground pivots, $s_{C0}$ and $s_{D0}$ are moving joint vectors, and $R_{CD}$ represents an unknown constant dot product. Since the goal is to find a mechanism that approximately satisfies this equation across many configurations, an error function is introduced:

$$\eta_j = [R(s_{A0}, \phi_j)]s_{C0} \cdot [R(s_{B0}, \psi_j)]s_{D0} - R_{CD}$$

The total objective function to be minimized is the sum of squared errors:

$$f = \frac{1}{2}\sum_{j=0}^{N-1} \eta_j^2$$

where N is the number of prescribed angle pairs. This objective function ensures that the synthesized mechanism approximates the desired function while allowing for small deviations.

Since the joint vectors $s_{C0}$ and $s_{D0}$ define rotational axes, they must satisfy unit magnitude constraints to ensure proper spherical motion:

$$s_{C0} \cdot s_{C0} = 1,\ s_{D0} \cdot s_{D0} = 1$$

If the mechanism allows free placement of the second ground pivot, then the vector $s_{B0}$ is also a design variable, requiring an additional constraint:

$$s_{B0} \cdot s_{B0} = 1$$

Thus, the following optimization problem has been framed:

$$\min_{sC0,sD0,RCD} f = \frac{1}{2}\sum_{j=0}^{N-1} \eta_j^2$$

A Lagrangian function is introduced as a method to solve this optimization problem while enforcing constraints using Lagrange multipliers (λ). It is given by:

$$L = f + \lambda_1(s_{C0} \cdot s_{C0-1}) + \lambda_2(s_{D0} \cdot s_{D0-1})$$

The stationarity conditions are derived by taking the partial derivatives of L with respect to $s_{C0}$, $s_{D0}$, and $R_{CD}$, forming a square system of polynomial equations. These equations are solved using polynomial homotopy continuation, which finds main points of the optimization landscape. Polynomial homotopy continuation finds the main points of the optimization landscape by transforming the given system of equations into a simpler version that is easier to solve, then continuously deforming the solutions of the simpler system into solutions of the original problem. In the most general case where all mechanisms dimensions may vary, there is an estimated maximum of 268 sets of main points. In a more specific case that enables the predefined placement of one or more ground pivots, there is an estimated maximum of 61 sets of main points. Each main point represents a potential mechanism design, and an eigenanalysis of the projected Hessian matrix corresponding to the main points determines whether it is a minimum, maximum, or saddle point.

By utilizing global optimization instead of local iterative searches, this formulation enables all possible solutions to be found, further enabling the selection of an optimal mechanism for deployable aircraft wings.

Figure 4:
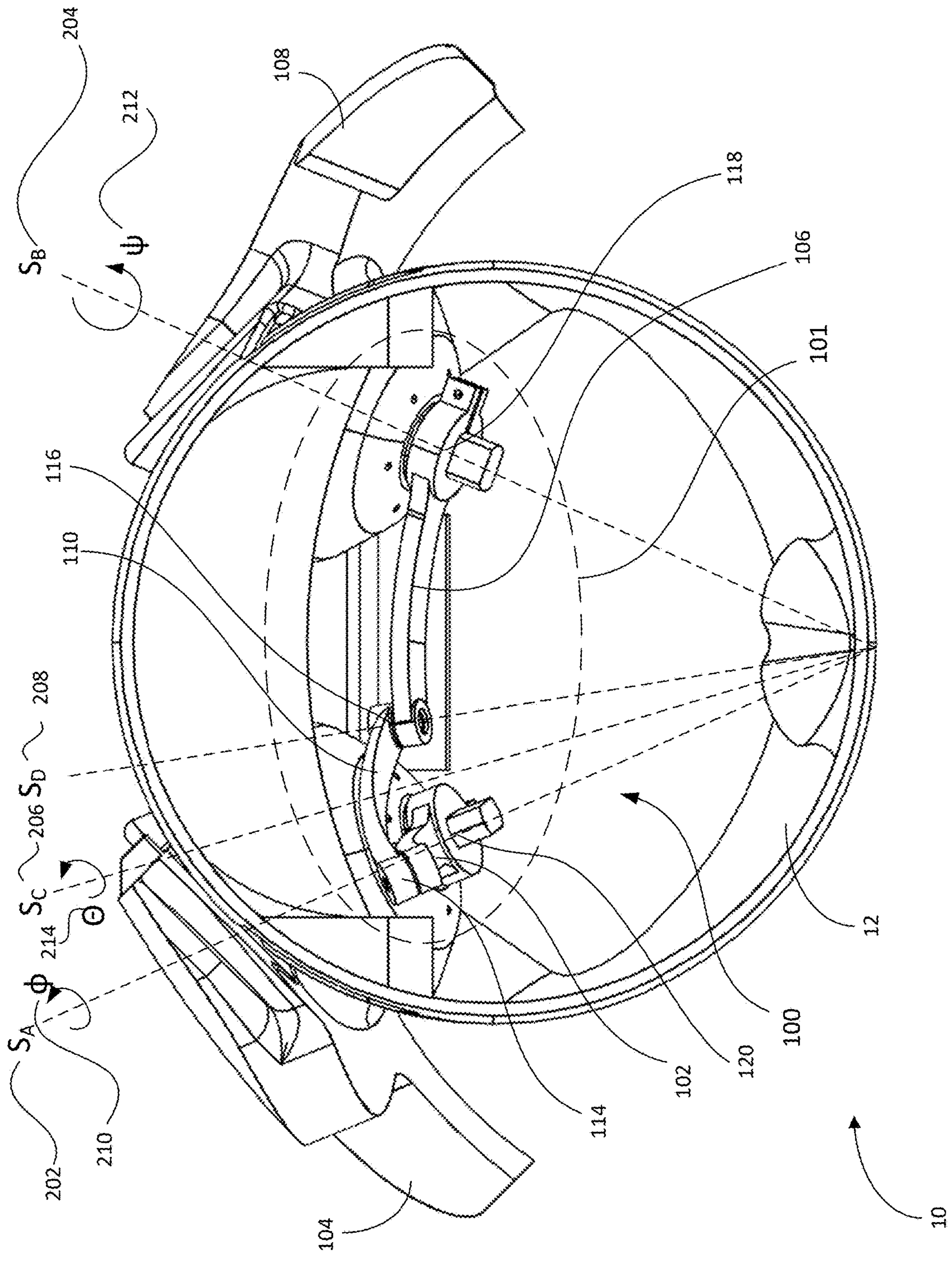
FIG. 4 illustrates a front elevation and cross section view of the example apparatus shown in FIGS. 1A-C, taken along Section A-A shown in FIG. 1A, further showing the relationship of movements of an example spherical four-bar mechanism.

FIG. 3 shows an example of the spherical four-bar mechanism 101 created in accordance with the kinematic relationships between linkages in a spherical four-bar mechanism. Additionally, FIG. 4 shows the example spherical four-bar mechanism 101 according to the kinematic relationships between linkages in a front perspective view according to the example apparatus 100 shown in FIG. 2. $S_A$ 202 refers to the translation (or position in coordinates) of a joint 120 between the first bar 102 carrying the first wing 104 and the fourth bar 112 (fuselage 12). Φ 210 refers to the rotation of the joint 120 between the first bar 102 carrying the first wing 104 and the fourth bar 112 (fuselage 12). $S_B$ 204 refers to the translation (or position in coordinates) of a joint 118 between the second bar 106 carrying the second wing 108 and the fourth bar 112 (fuselage 12). ψ 212 refers to the rotation of the joint 118 between the second bar 106 carrying the second wing 108 and the fourth bar 112 (fuselage 12). $S_C$ 206 refers to the translation (or position in coordinates) of a joint between the third bar 110 and the first bar 102. The third bar 110 is fastened to the first bar 102 at the first floating pinned joint 114. The third bar 110 is fastened to the second bar 106 at the second floating pinned joint 116. Θ 214 refers to the rotation of the joints 114, 116 between the third bar 110 and both the first bar 102 and the second bar 106, as the movement of joints are constrained together by nature of the spherical four-bar mechanism 101, described above. $S_D$ 208 refers to the translation (or position in coordinates) of the fourth bar $S_D$ 208. The fourth bar 112 (the fuselage 12) fixes the translational positions $S_A$ 202 of the joint 120 and $S_B$ 204 of the joint 118 with respect to each other. The movement $S_C$ 206 can be mathematically defined by the rotation Φ 210 of the joint 120 with respect to the rotation v 212 of the joint 118. Because the first bar 102 and the second bar 106 are grounded, or fixed by the fourth bar 112, or fuselage 12, the fourth bar 112 is prevented from rotation. The fourth bar 112 is also the frame or the fuselage 12 of the plane which completes the closed loop linkage, closing the linkage by fixing the translational location of the first bar 102 and the second bar 106, constraining their movement to only rotation.

Figure 5:
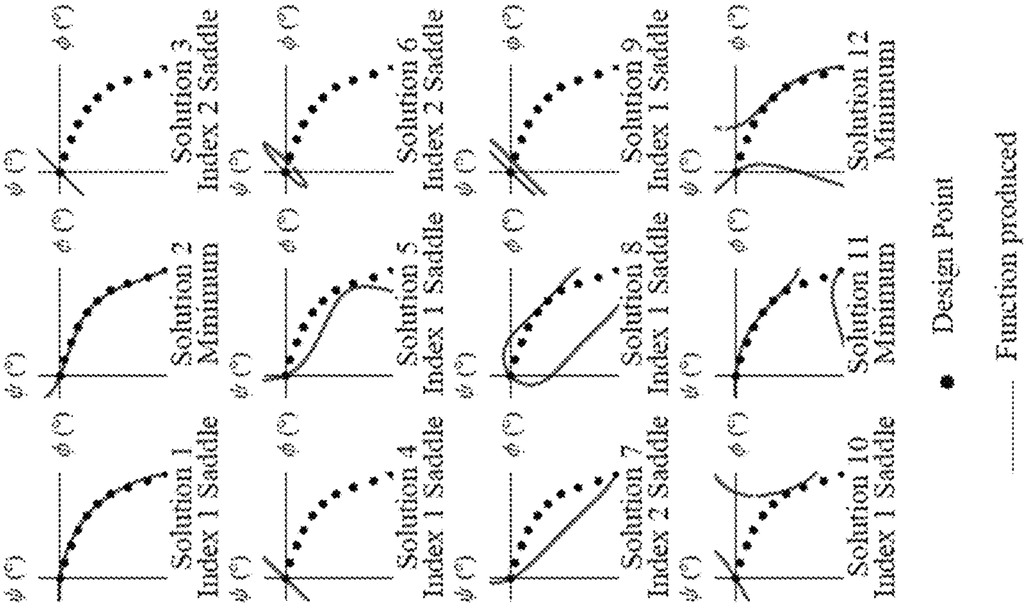
FIG. 5 is a chart comprising a series of theoretical solutions to a system of kinematic equations defining the movements of the spherical four-bar apparatus for deploying the wings of an aircraft illustrated in FIGS. 2 and 4.

Turning now to FIG. 5, a system of kinematic equations—as discussed above with respect to FIG. 3 and which defines the geometric parameters (e.g., size) and motion profile (e.g., movement) of the spherical four-bar mechanism 101—can be computationally generated to coordinate unfolding angles for an aircraft with deployable wings. Using variables in the equations defined at the beginning of the calculations, a computing device (described below with respect to FIG. 15) can calculate a motion profile of the spherical four-bar mechanism 101, which defines movements of the components within the spherical four-bar mechanism 101. In this way, the motion profile of the spherical four-bar mechanism 101 may be optimized to coordinate the rotation between the first bar 102 and the second bar 106, and thus coordinate the opening of the first wing 104 and the second wing 108 of the aircraft 10, for instance, to avoid collision between the first wing 104 and the second wing 108. The system of equations may be adjusted to change the size and/or rotation of the bars in the spherical four-bar mechanism 101, such that the spherical four-bar mechanism 101 may be adjusted to accommodate different sized wings and/or aircraft.

Axis coordinates are presented in the format {[x position], [y position], [z position]}. $S_{A0}$ (the starting point of the first bar) is set to {1, 0, 0}. A geometric plane is spanned by $S_{A0}$ & $S_{B0}$. Without loss of generality to the function produced, any geometric plane may be chosen. For example, a geometric plane is created between the first bar 102 and the second bar 106 as the basis for the coordinate system, and this does not affect the optimization of the system of equations. Both $S_{A0}$ and $S_{B0}$ are set into the z=0 geometric plane. Therefore, the second fixed axis takes the form $S_{B0}=\{S_{Bx0}, S_{By0}, 0\}$. The base of the first bar 102 and the second bar 106 may be both fixed at a specified point to the aircraft's frame (e.g. the fuselage 12 or the fourth bar 112). This assumption also does not affect the system's ability to optimize the system of equations, because the spherical four-bar mechanism 101 is fixed to the aircraft 10 at a point to generate the force needed to deploy the wings.

In one example, the relative interior angle between the axes $s_{A0}$ and $s_{B0}$ is 20 degrees, and a kinematic synthesis process approximates function generation by a four-bar with both ground pivots predefined. The four-bar may result in a motion profile that coordinates the movement of the wings to avoid collision or other mechanical interferences between the wings. The pivot axes $s_{A0}$ and $s_{B0}$ are in the direction of the joints connecting the wings to the fuselage.

The table below (table 1) shows angle positions. The angle positions represent the angular rotation of the first bar 102 and the second bar 106 of the spherical four-bar mechanism 101, which in turn represent the opening angle Φ 210 for the first wing 104 connected to the first bar 102, and ψ 212 for the second wing 108 connected to the second bar 106 at point j in the opening sequence for deploying the first wing 104 and second wing 108 of the aircraft 10. The angles are chosen at each interval point j so that the wings open without colliding with one another. The angle pairs must move from the stowed configuration, (0°, 0°), to the fully deployed configuration, (99.2°, −99.2°). Between these configurations, the two joints counter-rotate in a nonlinear manner to avoid collision. Specifically, the right wing rotates more quickly at the beginning of the deployment to get clear of the left wing. In total, 10 angle pairs, (ϕj, ψj), j=0, . . . , 9, were chosen.

TABLE 1

Angle Pairs for Kinematic Synthesis

| j | $\Phi_j$ | $\Psi_j$ |
|---|---|---|
| 0 | 0° | 0° |
| 1 | 14.8969° | −4.0107° |
| 2 | 30.9397° | −10.3132° |
| 3 | 45.2637° | −16.6158° |
| 4 | 59.0147° | −25.2101° |
| 5 | 69.9009° | −34.9504° |
| 6 | 79.6411° | −46.9825° |
| 7 | 85.9437° | −63.0254° |
| 8 | 91.6732° | −81.9330° |
| 9 | 99.2° | −99.2° |

The table 500 shows possible solutions to the kinematic synthesis system of equations for the angle pairs of table 1. Using polynomial homotopy continuation, all 61 main points were found repeatedly in less than 5 seconds using a personal computing device. Eliminating imaginary solutions and the single known degenerate solution ($s_{C0}=s_{A0}$ and $s_{D0}=s_{B0}$) resulted in the 12 physical solutions shown in table 500.

The resulting relationships between the size and movement of each of the bars in the spherical four-bar mechanism 101 output a relationship between the rotation Φ 210 of the first wing 104 (plotted on the X-axis) and rotation ψ 212 of the second wing 108 (plotted on the Y-axis), plotted in red. The solutions are compared against the values from the Table 1 above (the black dots) to determine which spherical four-bar mechanism design produces a rotational relationship between the first bar 102 and the second bar 106 that is closest to the "solution" or the desired rotational relationship between the first wing 104 and the second wing 108.

An eigenanalysis of the physical solutions identified three minima and nine saddles. Solution 2 may be considered the global optimal solution because it is a minimum, it approximates the angle pairs most closely, and it does not pass through any singular configurations. The function of solution 2 can be produced by four different constructions of the mechanism, which are found by toggling the positive and negative directions of $s_{C0}$ and $s_{D0}$.

As demonstrated by this example, the approximate kinematic synthesis process is not based in iterative local search but rather the globally throughout the design space, including local minima and global minima.

Figure 6B:
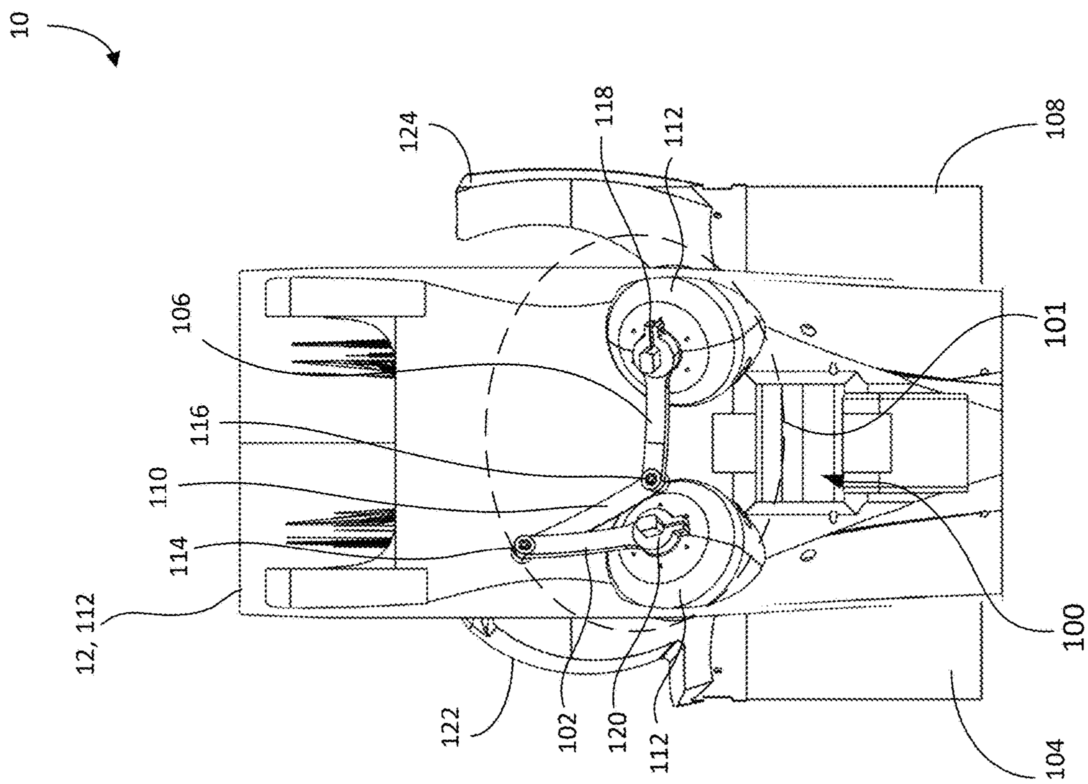
FIG. 6B illustrates a bottom plan view of the example apparatus shown in FIGS. 2 and 4, in the first configuration of the aircraft shown in FIG. 1A.
Figure 6A:
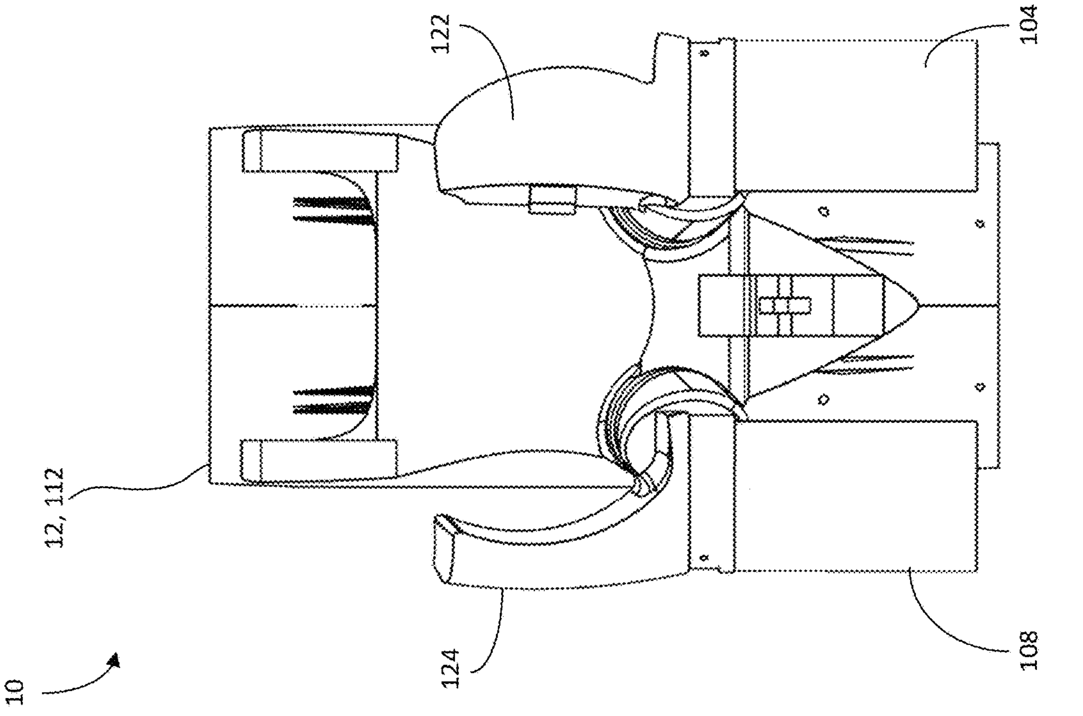
FIG. 6A illustrates a top plan view of the example apparatus shown in FIGS. 2 and 4, in the first configuration of the aircraft shown in FIG. 1A.
Figure 6C:
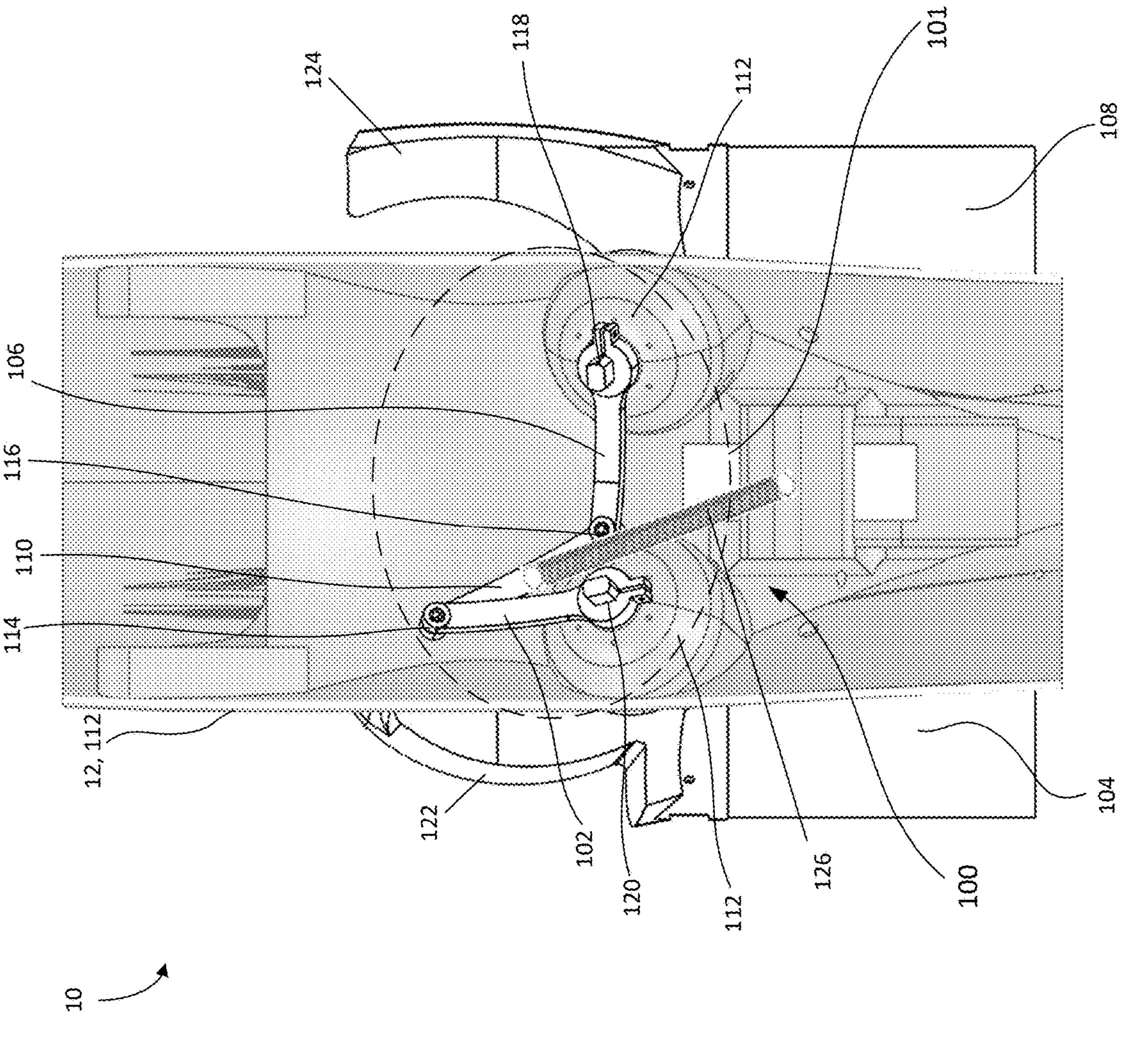
FIG. 6C illustrates a bottom plan detailed view of the example apparatus shown in FIGS. 2 and 4, in the first configuration of the aircraft shown in FIG. 1A.

FIGS. 6A-C show an example of the apparatus 100 used to deploy the first wing 104 and the second wing 108 of the aircraft 10. The wings 104, 108 in FIGS. 6A-C are in the closed or stored position. In the example, the wings 104, 108 are stored alongside the fuselage 12 of the aircraft 10, such that the wings 104, 108 are substantially parallel to the fuselage 12 of the aircraft 10. Shown in FIG. 6A, the first wing 104 has a first tab 122. The second wing 108 has a second tab 124. The tabs 122, 124 of each respective wing 104, 108 is configured to mate with the tab 122, 124 of the other wing 104, 108 such that air drag, or air resistance is reduced when the two wings 104, 108 are in the deployed or in-use position.

Shown in FIG. 6B, and in further detail in FIG. 6C, the apparatus 100 for deploying the wings 104, 108 of an aircraft 10 are in a first position corresponding to a first, stored or closed position of the wings 104, 108. The fuselage 12, which acts as the fourth bar 112 of the apparatus 100 may wrap around a portion of the first bar 102 and the second bar 106 such that the first bar 102 and the second bar 106 are prevented from translational movement and are confined only to rotational movement. A deployment actuator 126 may be fastened to any one of the first bar 102, second bar 106, or third bar 110 on one end of the deployment actuator 126. The deployment actuator 126 may be fastened to the fourth bar 112, or fuselage 12 at a second end of the deployment actuator 126. The deployment actuator 126 may provide a force to any or all of the first bar 102, second bar 106, and/or third bar 110, which in turn may initiate a movement of those bars with respect to the fourth bar 112 and/or fuselage 12 due to the fixed, rotatable joints between the first bar 102 and second bar 106 to the fourth bar 112 and/or fuselage 12.

In an example, the deployment actuator 126 may be an elastic member such as a spring. For instance, elastic actuation involves using mechanical springs (e.g., torsional springs) to deploy the wings. The wings are held in a stowed position against the force of preloaded springs, which store potential energy. Upon release, this energy is converted into motion, driving the wings to unfold. In the example, the deployment actuator 126 may exert a force on any of the first bar 102, second bar 106, or third bar 110 with respect to the fourth bar 112 or fuselage 12 of the aircraft 10 to enable movement of the spherical four-bar mechanism 101.

In another example, the deployment actuator 126 may be a shape memory alloy, hydraulic piston, electromagnetic piston, thermally activated piston, thermo-electrically activated piston, motor (such as an electric motor), system of pulleys, and/or any other suitable actuator. For example, shape memory alloy wires or strips may be embedded within the wing deployment mechanism for space-constrained applications. When heated (e.g., through electrical resistance heating), the shape memory alloy contracts, driving the wings to unfold. As another example, aerodynamic forces (e.g., drag from a parachute or airbrake system) may passively deploy the wings, taking advantage of existing aerodynamic forces.

Figure 7B:
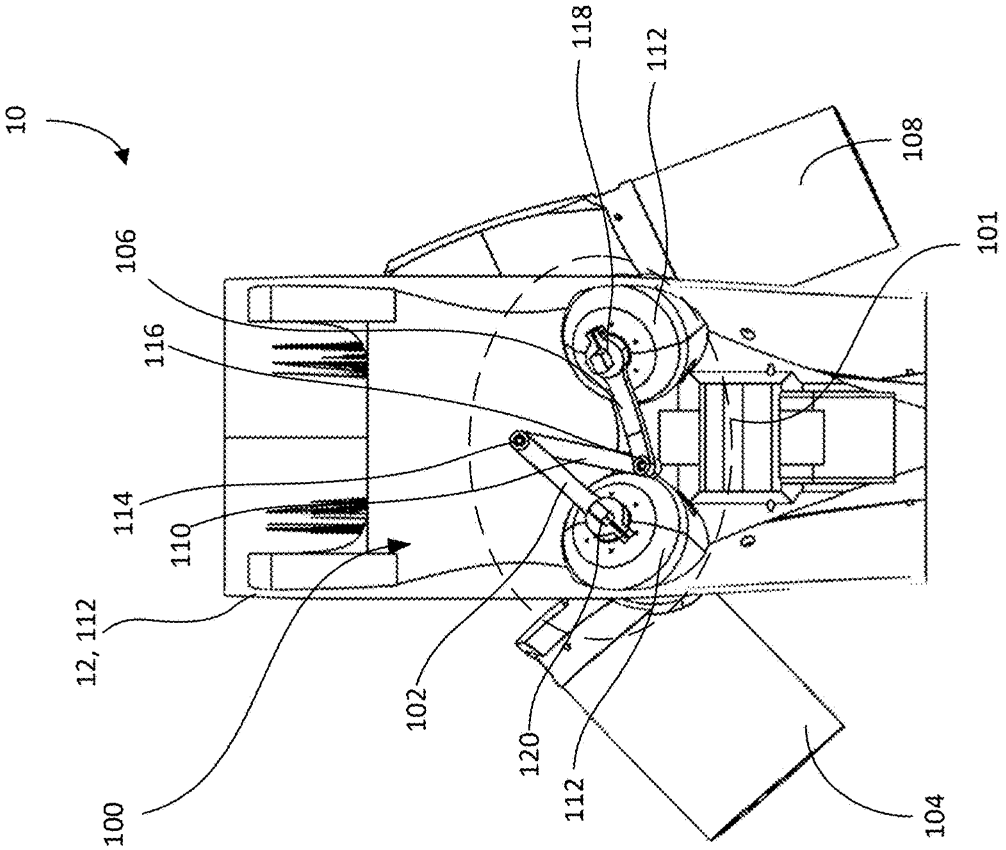
FIG. 7B illustrates a bottom plan view of the example apparatus shown in FIGS. 2 and 4, in the third configuration of the aircraft shown in FIG. 1C.
Figure 7A:
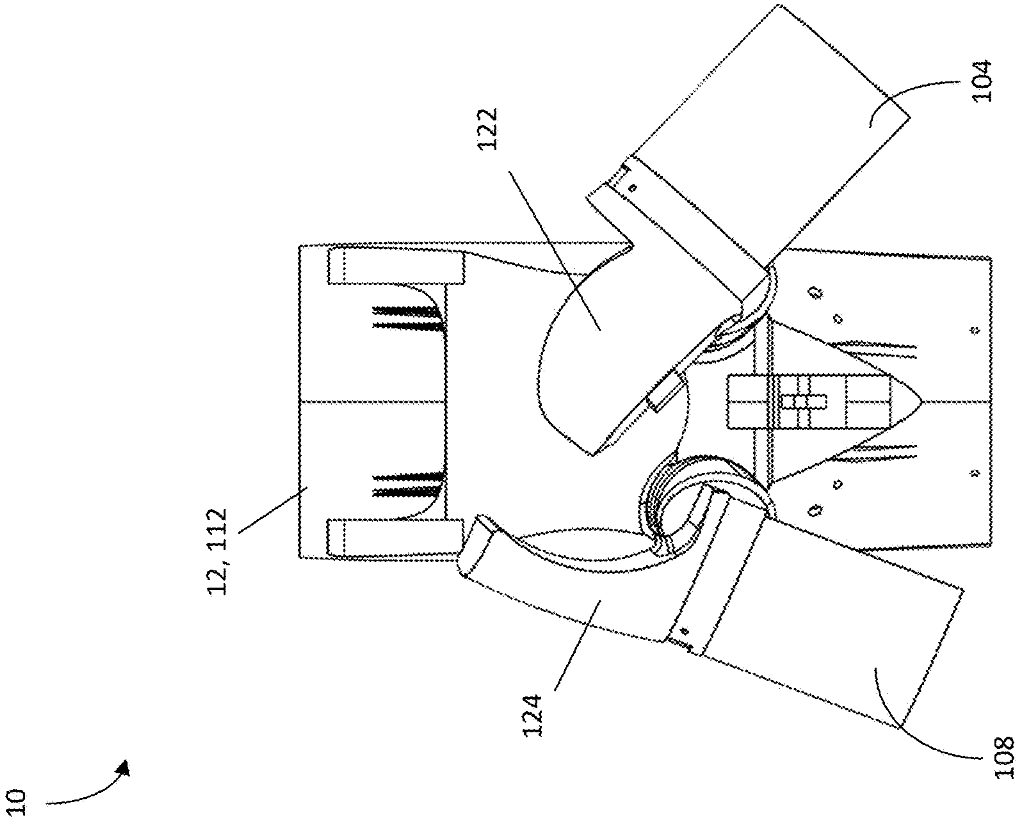
FIG. 7A illustrates a top plan view of the example apparatus shown in FIGS. 2 and 4, in the second configuration of the aircraft shown in FIG. 1B.

FIGS. 7A-B shows the example apparatus 100 from FIGS. 6A-C in a second position occurring during deployment of the wings 104, 108. The force exerted on the spherical four-bar mechanism 101 may cause the mechanism to move according to the defined motion profile (e.g., relationship among the joints between the first bar 102, second bar 106, third bar 110, and fourth bar 112), as calculated through a kinematic synthesis process using polynomial homotopy continuation described above. The movement of the spherical four-bar mechanism 101 may bring the first wing 104 and the second wing 108 from a stowed configuration to a deployed configuration in a coordinated movement pattern, such as the movement pattern in angles of rotation as specified and described in the above Table 1 and one of the solutions illustrated in table 500. In an example, such as the example shown in FIGS. 7A-B, the tabs 122, 124 of wings 104, 108 and design of the spherical four-bar mechanism 101 may enable the wings 104, 108 to open at different rotational rates and non-simultaneously. In some examples, the tabs 122, 124 of the wings 104, 108 and design of the spherical four-bar mechanism 101 may enable the wings 104, 108 to open at the same rotational rate and/or simultaneously.

Figure 8A:
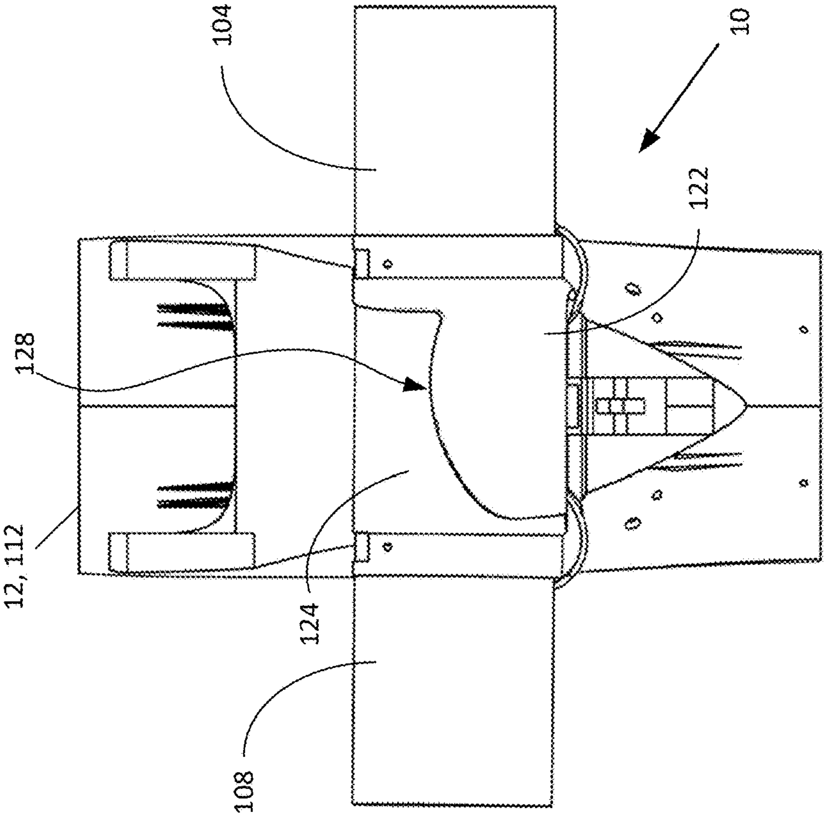
FIG. 8A illustrates a top plan view of the example apparatus shown in FIGS. 2 and 4, in the third configuration of the aircraft shown in FIG. 1C.
Figure 8B:
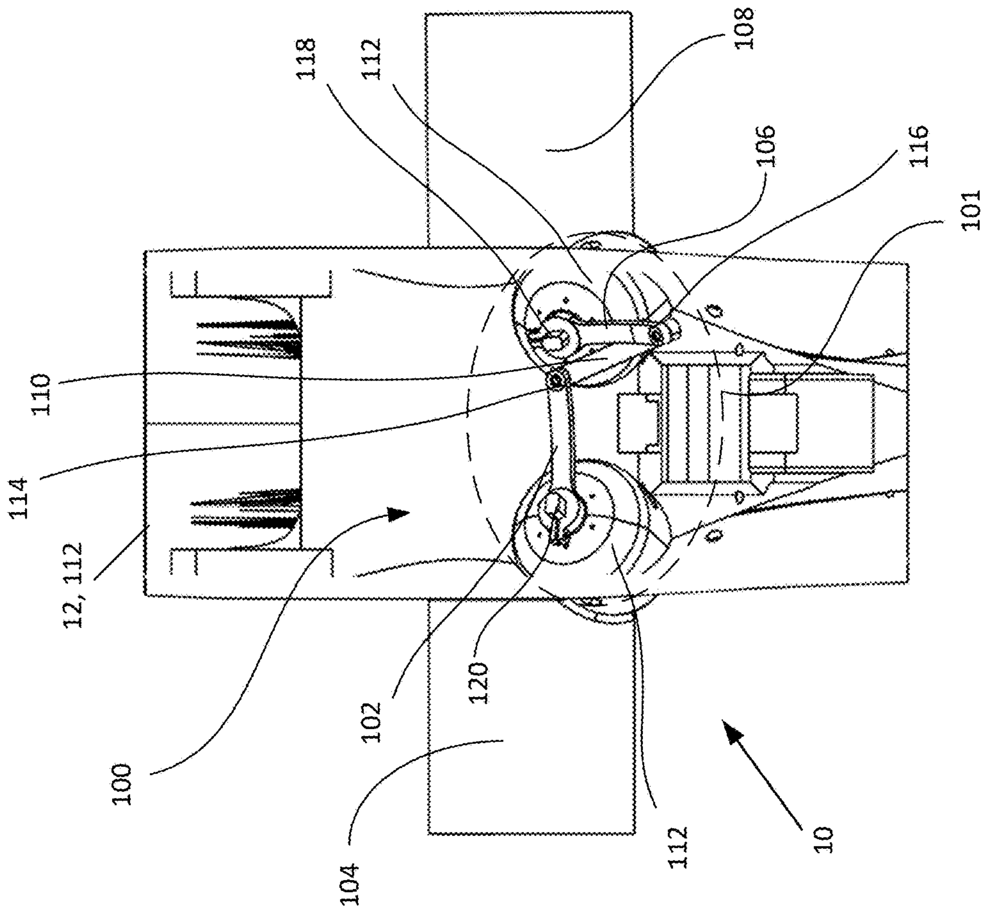
FIG. 8B illustrates a bottom plan view of the example apparatus shown in FIGS. 2 and 4, in the third configuration of the aircraft shown in FIG. 1C.
Figure 8C:
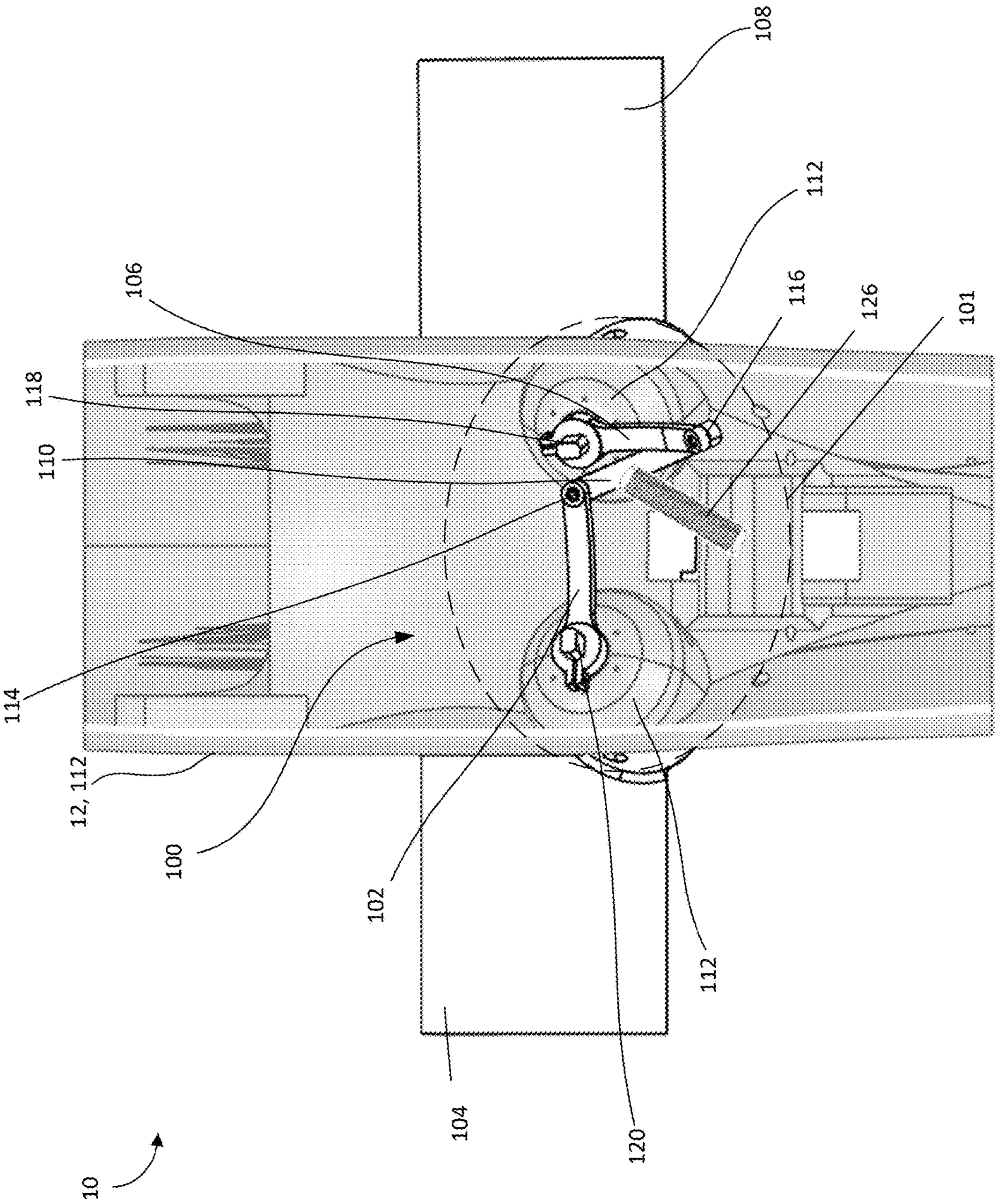
FIG. 8C illustrates a bottom plan detailed view of the example apparatus shown in FIGS. 2 and 4, in the third configuration of the aircraft shown in FIG. 1C.

FIGS. 8A-C illustrate the example apparatus 100 from FIGS. 6A-C in a third and fully deployed configuration of the wings 104, 108. In the example, the spherical four-bar mechanism 101 reaches an end of travel, which in the example may be defined by a mating profile 128 between the first wing 104 and the second wing 108. The mating of the wings 104, 108 at the mating profile 128 may prevent the spherical four-bar mechanism 101 from moving any further. The wings 104, 108 in FIGS. 8A-C are in the open or in-use position. In the example, the wings 104, 108 are substantially perpendicular to the fuselage 12 of the aircraft 10, such that the wings are capable of providing lift to the aircraft 10. The first wing 104 and the second wing 108 each have a tab 122, 124 to mate with the other of the first or second wing 104, 108 such that when in the deployed or open, in-use position form the mating profile 128 that may reduce air drag or air resistance across the mating point between the first wing 104 and the second wing 108 when in the deployed position.

Figure 8D:
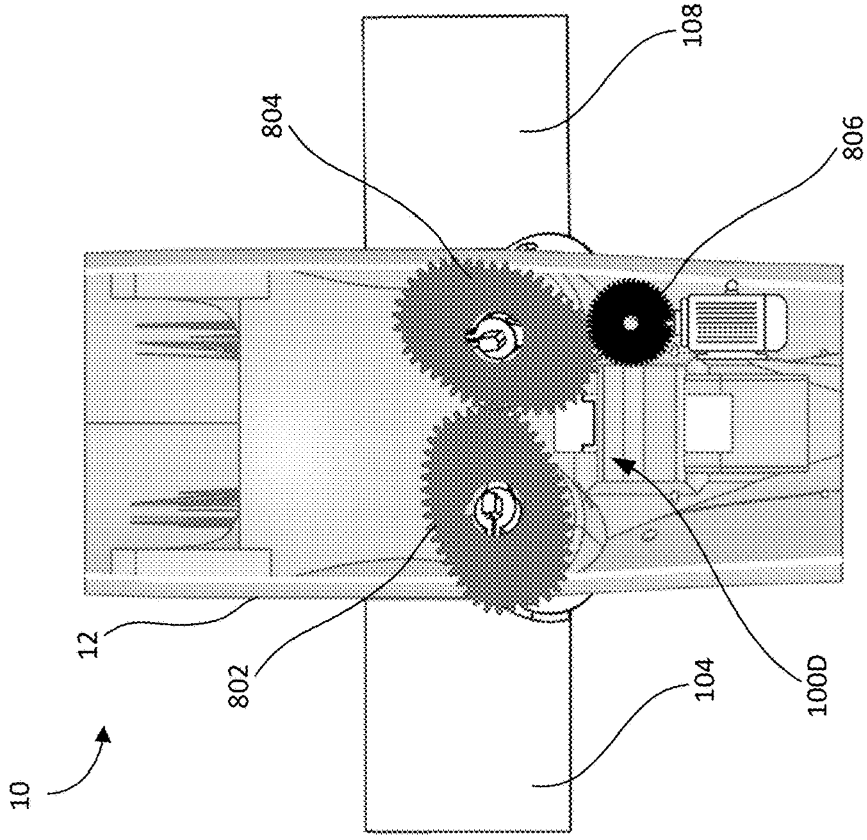
FIG. 8D illustrates a bottom plan detailed view of an example apparatus for deploying the wings of the aircraft shown in FIGS. 1A-C.
Figure 8E:
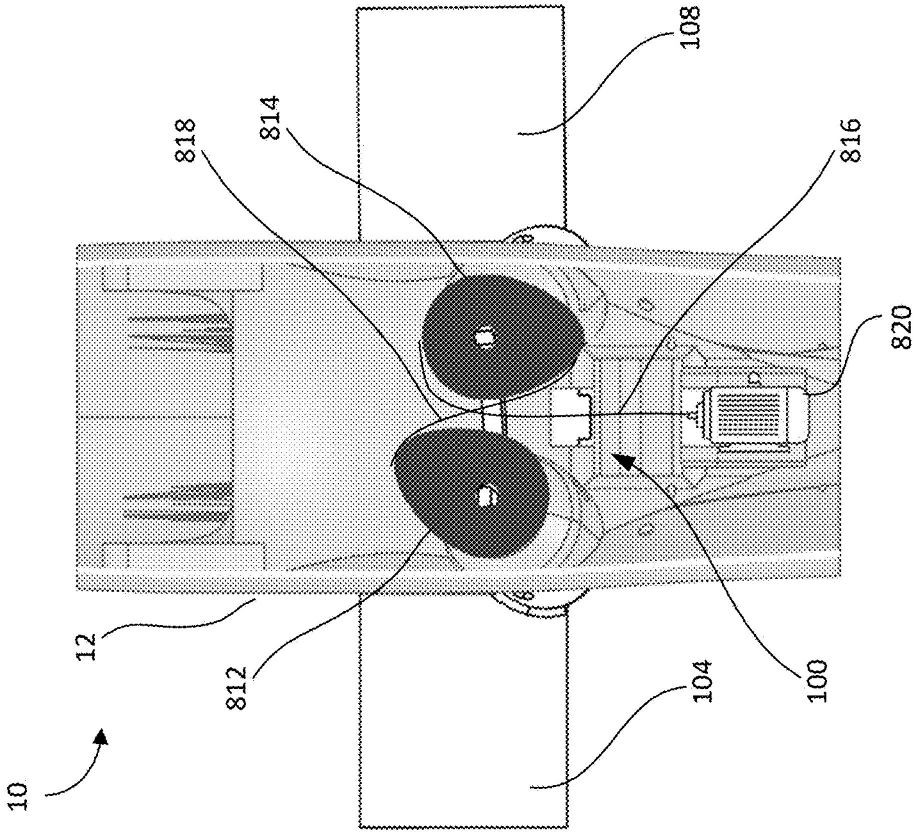
FIG. 8E illustrates a bottom plan detailed view of an example apparatus for deploying the wings of the aircraft shown in FIGS. 1A-C.

In some embodiments, the apparatus 100 may be a mechanism other than a closed-loop mechanism (e.g., 4-bar, 5-bar, . . . , N-bar linkage). FIGS. 8D-E illustrate other examples of the apparatus 100 used to deploy the wings 104, 108 of the aircraft 10. In the example shown in FIG. 8D, mechanical gears 802, 804 form the apparatus 100, which in the example is a geartrain 100D that controls the opening or deployment of the wings 104, 108 of the aircraft 10. The wings 104, 108 are coupled (e.g., fastened) to the gears 802, 804. In the example, the gears 802, 804 may be non-circular gears, which when meshed, provide variable rates of rotation, and may thus provide for asymmetric and/or nonlinear deployment of the wings 104, 108 of the aircraft 10 in order to prevent collision of the wings 104, 108. In the example, a motor with a driving gear 806 may be connected to one of the non-circular gears 802, 804 to drive the geartrain 100D and deploy the wings 104, 108.

In the example, a system of mathematical equations may be used to calculate the relative rotational rates of the non-circular gears 802, 804 in much the same way that a system of mathematical equations may be used to calculate the rotation of the bars of a spherical four-bar mechanism. Thus, the profile of the gears 802, 804 can be designed to accommodate the asymmetric deployment of the wings 104, 108 in much the same manner as an N-bar mechanism (e.g., spherical four-bar).

FIG. 8E illustrates an example of the apparatus 100 used to deploy the wings 104, 108 of the aircraft 10. In the example, mechanical cams 812, 814 form the apparatus 100 used to deploy aircraft wings 104, 108. In the example, cams 812, 814 may be non-circular cams, and the cams 812, 814 are connected by a series of pulleys 816, 818. One pulley 818 may be ultimately connected to a motor 820 that, when activated, may pull on pulley 818 and actuate the cams 812, 814. In the example, the non-circular profile of the cams 812, 814 provide variable rates of rotation, and may thus provide for asymmetric and/or nonlinear deployment of the wings 104, 108 of the aircraft 10 in order to prevent collision of the wings.

In the example, a system of mathematical equations may be used to calculate the relative rotational rates of the non-circular cams 812, 814 in much the same way that a system of mathematical equations may be used to calculate the rotation of the bars of a spherical four-bar mechanism. Thus, the profile of the cams 812, 814 can be designed to accommodate the asymmetric and/or nonlinear deployment of the wings 104, 108 in much the same manner as an N-bar mechanism (e.g., spherical four-bar).

Figure 9:
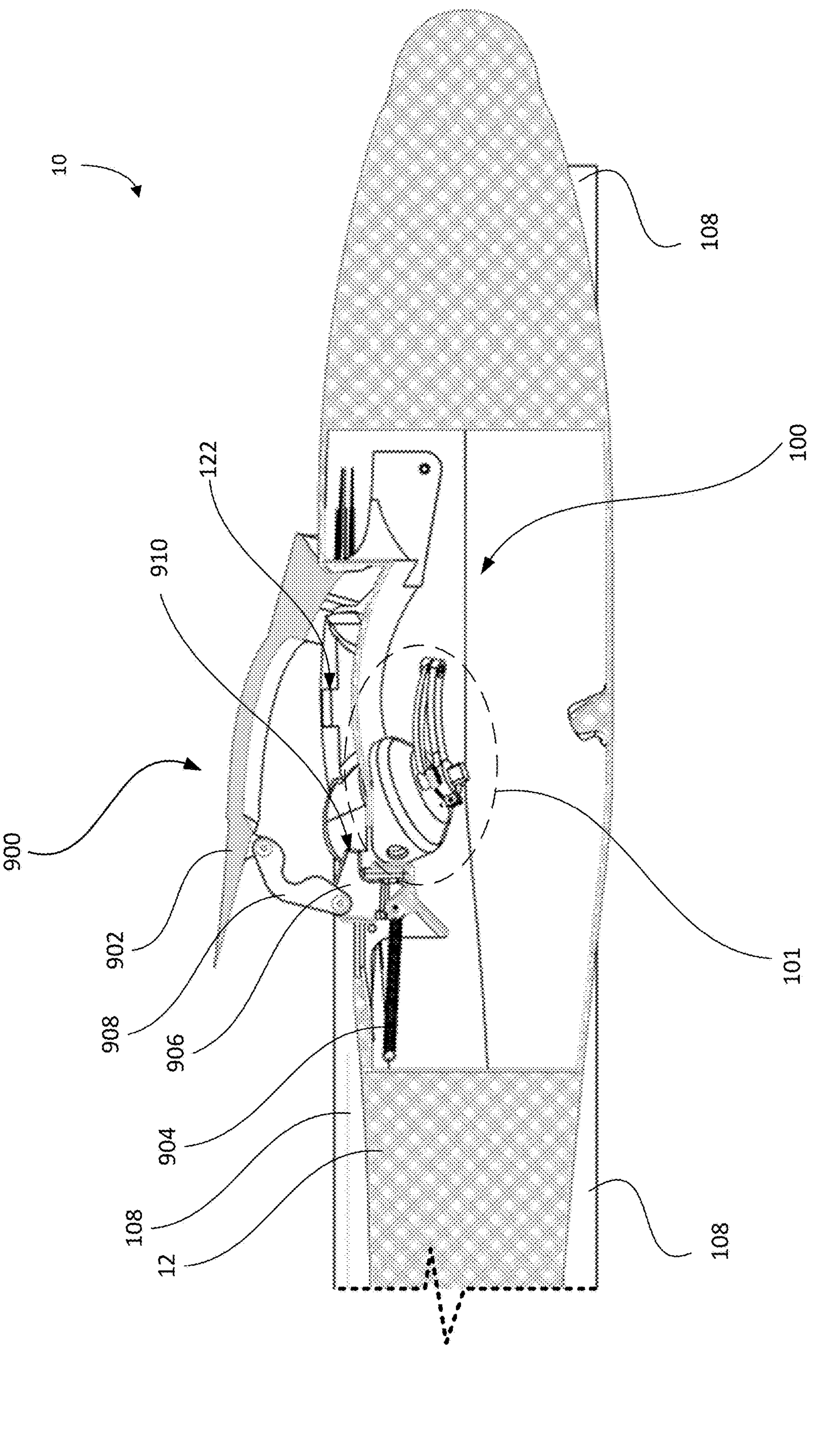
FIG. 9 illustrates a side elevation, partial detail and section view taken along Section B-B and according to Detail B of the example aircraft illustrated in FIG. 1C, further showing the knock-lock hinge assembly of the wing deployment mechanism in the first configuration illustrated in FIG. 1A, the undeployed position.

FIG. 9 shows an example of the apparatus 100 used to deploy the wings 104, 108 of the aircraft 10. The apparatus 100 may further contain a hinge flap (also referred to as a "knock-lock" or fairing clamp) assembly 900. The assembly 900 may further have a hinge flap 902 fastened to the fuselage 12 of the aircraft 10, and a hinge actuator 904 with one end connected to the fuselage 12 of the aircraft 10 and the other end connected to a knock lever 906. The knock lever 906 may be pivotally connected to the hinge flap 902 by a pivot member 908, such that when the knock lever 906 is contacted by the wing 104, the knock lever 906 is pulled back by the hinge actuator 904 and moves the pivot member 908 which in turn pivots the hinge flap 902 into a closed position over the spherical four-bar mechanism 101.

In the example illustrated, the hinge actuator 904 is an elastic member such as a spring in tension with the knock lever 906 and connected to the fuselage 12 of the aircraft. The knock-lock assembly 900 may be in an open configuration when the wings 104, 108 deploy to allow room for the wings 104, 108 to rotate to the deployed position. The knock-lock assembly 900 may be held open by the hinge actuator 904 and the knock lever 906. The knock lever 906 may be positioned such that, in an open configuration, the knock lever 906 forces the hinge flap 902 to remain in an open position, and prevents the hinge actuator 904, which in the example is a spring in tension with the fuselage 12, from pulling the hinge flap 902 down. The knock lever 906 may have a protrusion 910. In the example, the tab 122 of the first wing 104 may have a corresponding protrusion which, when the wings 104, 108 are being deployed, contacts the protrusion 910 of the knock lever 906 and allows the knock lever 906 to pivot around an inflection point and move the pivot member 908 according to the tension force provided by the hinge actuator 904, the spring in tension with the fuselage 12 and hinge flap 902.

Figure 10:
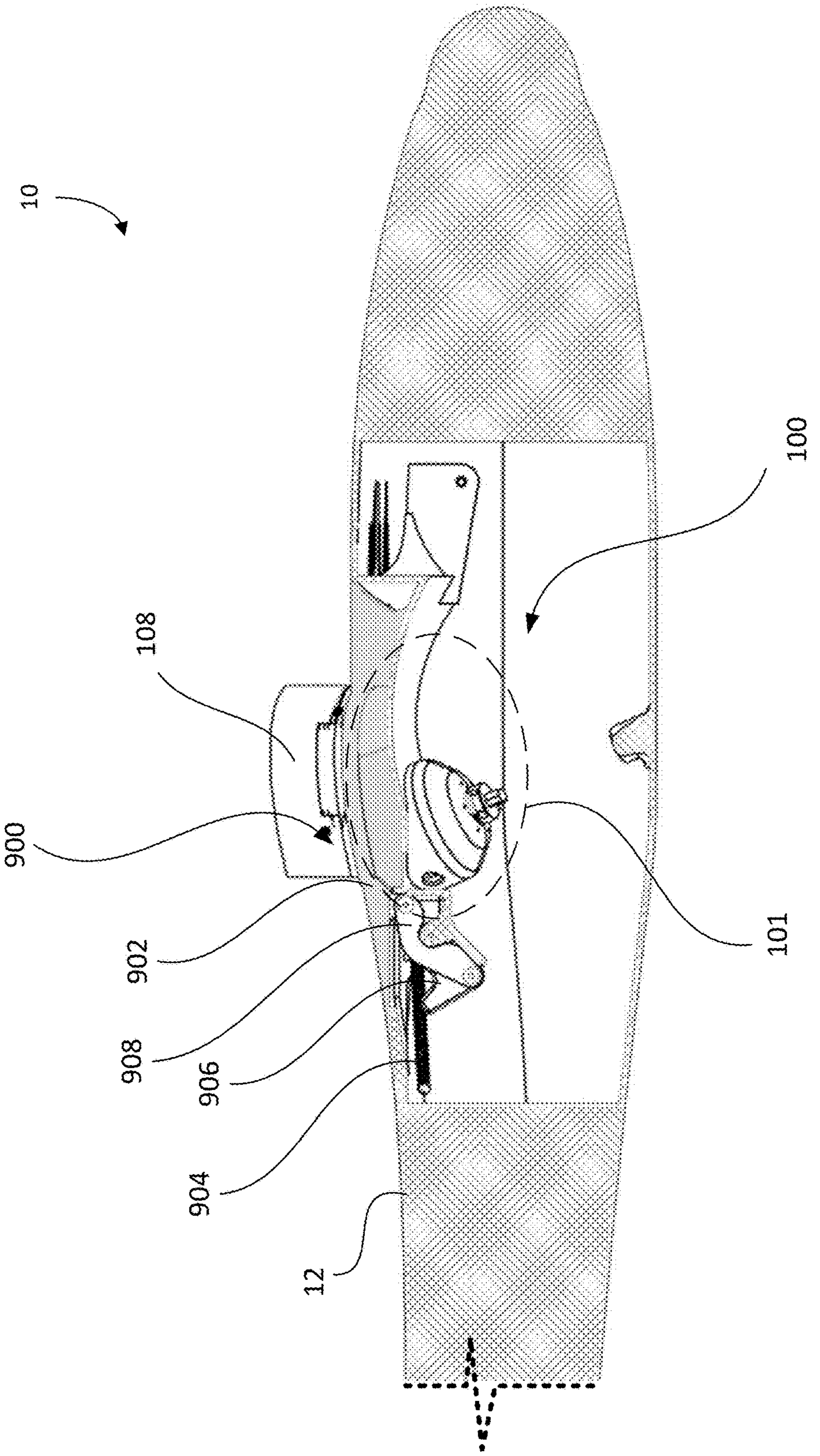
FIG. 10 illustrates a side elevation, partial detail and section view taken along Section B-B and according to Detail B of the example aircraft illustrated in FIG. 1C, further showing the knock-lock hinge assembly of the wing deployment mechanism in the third configuration illustrated in FIG. 1C, the deployed position.

FIG. 10 shows an example of the apparatus 100 when the wings 104, 108 are in the deployed position. The knock lever 906 pivots clear of the hinge flap 902, and the hinge actuator 904 pulls the hinge flap 902 into a closed position. The hidden hinge flap 902 is closed over the mating point of the first wing 104 and the second wing 108, such that the mating point between the two wings 104, 108 is covered by the hinge flap 902, and air resistance or air drag over the wings 104, 108 may be reduced.

Figure 11:
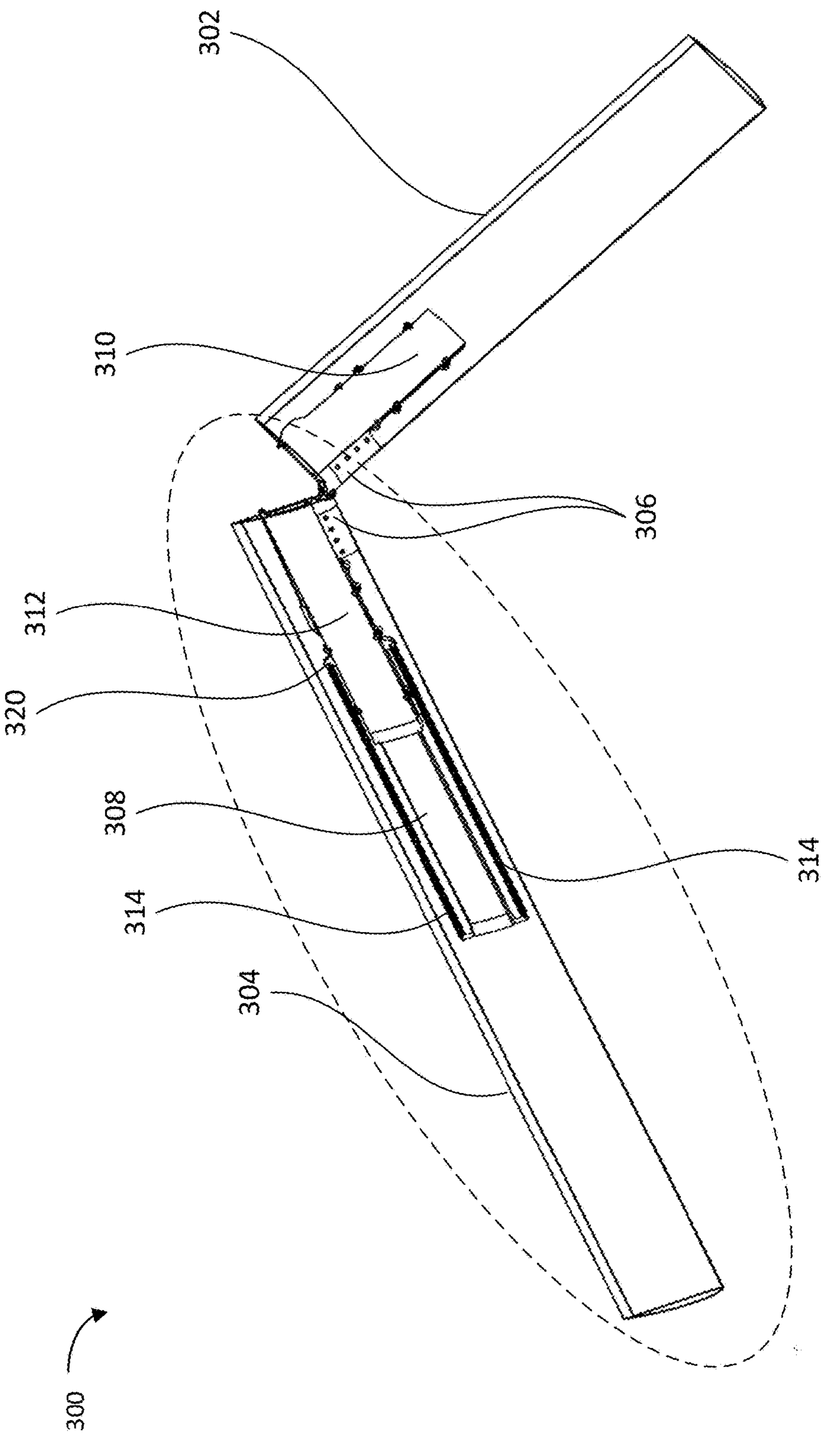
FIG. 11 illustrates a front perspective, partial detail and section view of an example wing of the aircraft illustrated in FIG. 1B according to Detail C, in a partially deployed position, further showing a mid-wing stiffening spar assembly.

FIG. 11 shows an example wing 104, 108 from the example aircraft 10 illustrated in FIGS. 1A-C. Shown in FIG. 11, in an example the wings 104, 108 may have a mid-wing hinge assembly 300. The mid-wing hinge assembly 300 may contain a first wing segment 302 and a second wing segment 304, which may be connected by a hinge 306. The outer coverings of the first wing segment 302 and the second wing segment 304 are shown transparently in FIG. 11 to show the internal components of the mid-wing hinge assembly 300. As illustrated in FIG. 11, the mid-wing hinge assembly 300 may further include a movable spar 308. The movable spar 308 may move between a first channel 310 located within the first wing segment 302 and a second channel 312 located within the second wing segment 304. The movable spar 308 may initially be located in a first position substantially within the second wing segment 304 during storage or when the wings 104, 108 of the aircraft 10 are folded. During deployment of the wings 104, 108, the movable spar 308 may move to a second position within both the first channel 310 and the second channel 312 to provide reinforcement and additional stiffness to the wings 104, 108 when the wings are unfolded.

In an example, one or more spar actuators 314 may act on the movable spar 308 to move it from a first position within the second channel 312 of the second wing segment 304 to a second position which is substantially within the first channel 310 of the first wing segment 302 and the second channel 312 of the second wing segment 304. In an example, such as the example illustrated in FIG. 11, the spar actuator 314 may be an elastic member, such as a spring connected in tension at a first end to the movable spar 308 and at a second end to a protrusion 320 on the second channel 312. In another example, the spar actuator 314 may be a hydraulic piston, an electromagnetic piston, a thermally activated piston, a thermo-electrically activated piston, a motor such as an electric motor, a system of pulleys, or any other such similar actuator.

Figure 12A:
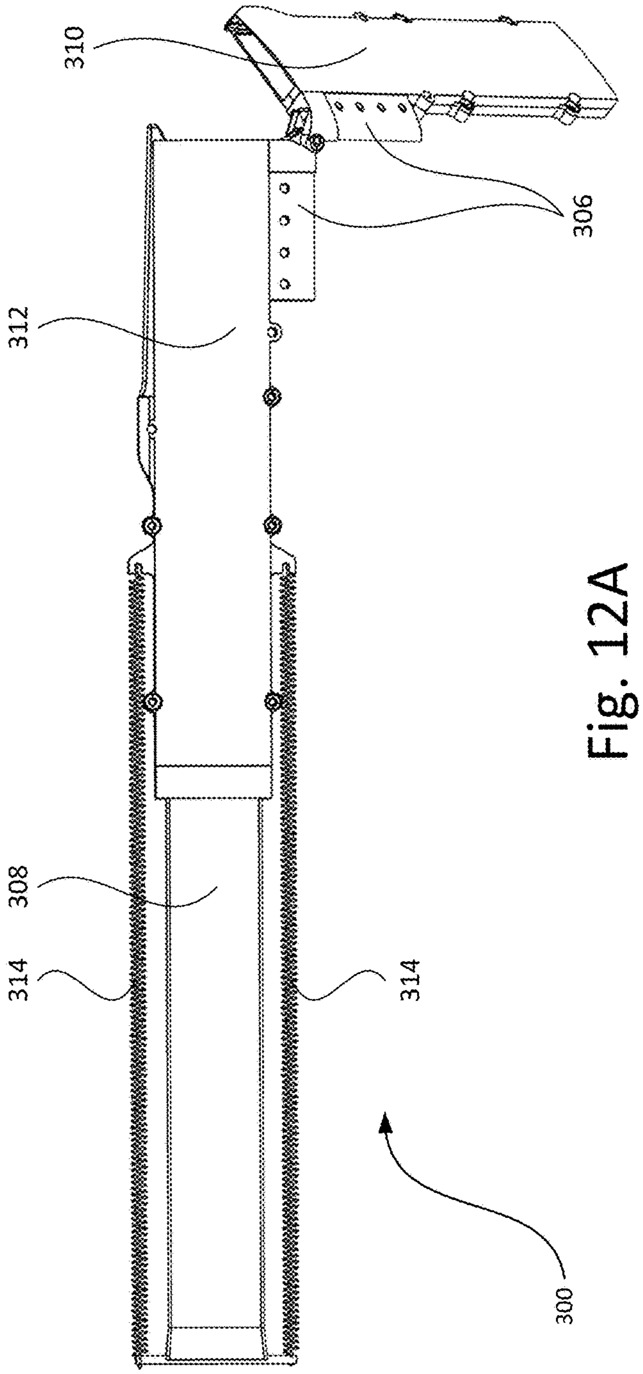
FIG. 12A illustrates a side elevation view of the example the mid-wing stiffening spar assembly shown in FIG. 11 in the second configuration of the airplane shown in FIG. 1B.
Figure 12B:
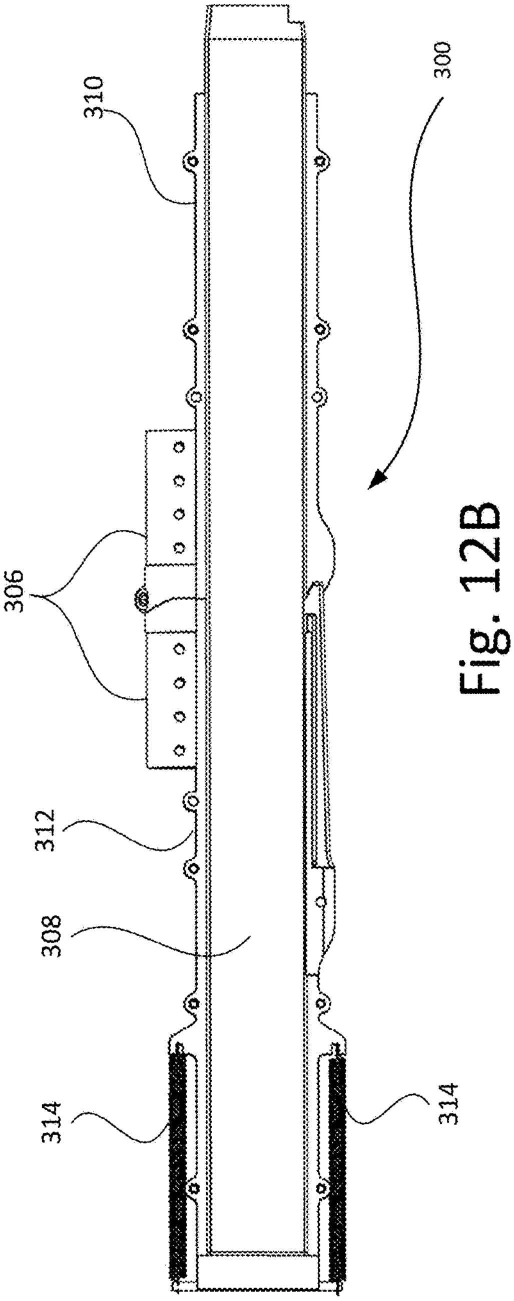
FIG. 12B illustrates a side elevation view of the example the mid-wing stiffening spar assembly shown in FIG. 11 in the third configuration of the airplane shown in FIG. 1C.

FIGS. 12A-B illustrate the example mid-wing hinge assembly 300. In order to provide visibility to the internal components of the mid-wing hinge assembly 300, the other shell of first wing segment 302 and the second wing segment 304 are not shown. FIG. 12A illustrates the example mid-wing hinge assembly 300 in a first, folded configuration. In the example shown, the first channel 310 may not be substantially colinear with the second channel 312. In this example, the second wing segment 304 shown in FIG. 11 may be folded with respect to the first wing segment 302 to allow for more compact storage of the example wing. Shown in the example illustrated in FIG. 12A, the movable spar 308 is in a first position which is substantially within the second channel 312. The movable spar 308 cannot move to the first channel 310 because the second channel 312 is not substantially colinear with the first channel 310.

FIG. 12B is a front elevation and cross section view of the example mid-wing hinge assembly 300 shown in FIG. 11 in a second, deployed configuration. Shown in FIG. 12B, the second channel 312 is substantially colinear with the first channel 310, such that the movable spar 308 is capable of moving from the second channel 312 to the first channel 310.

Figure 13:
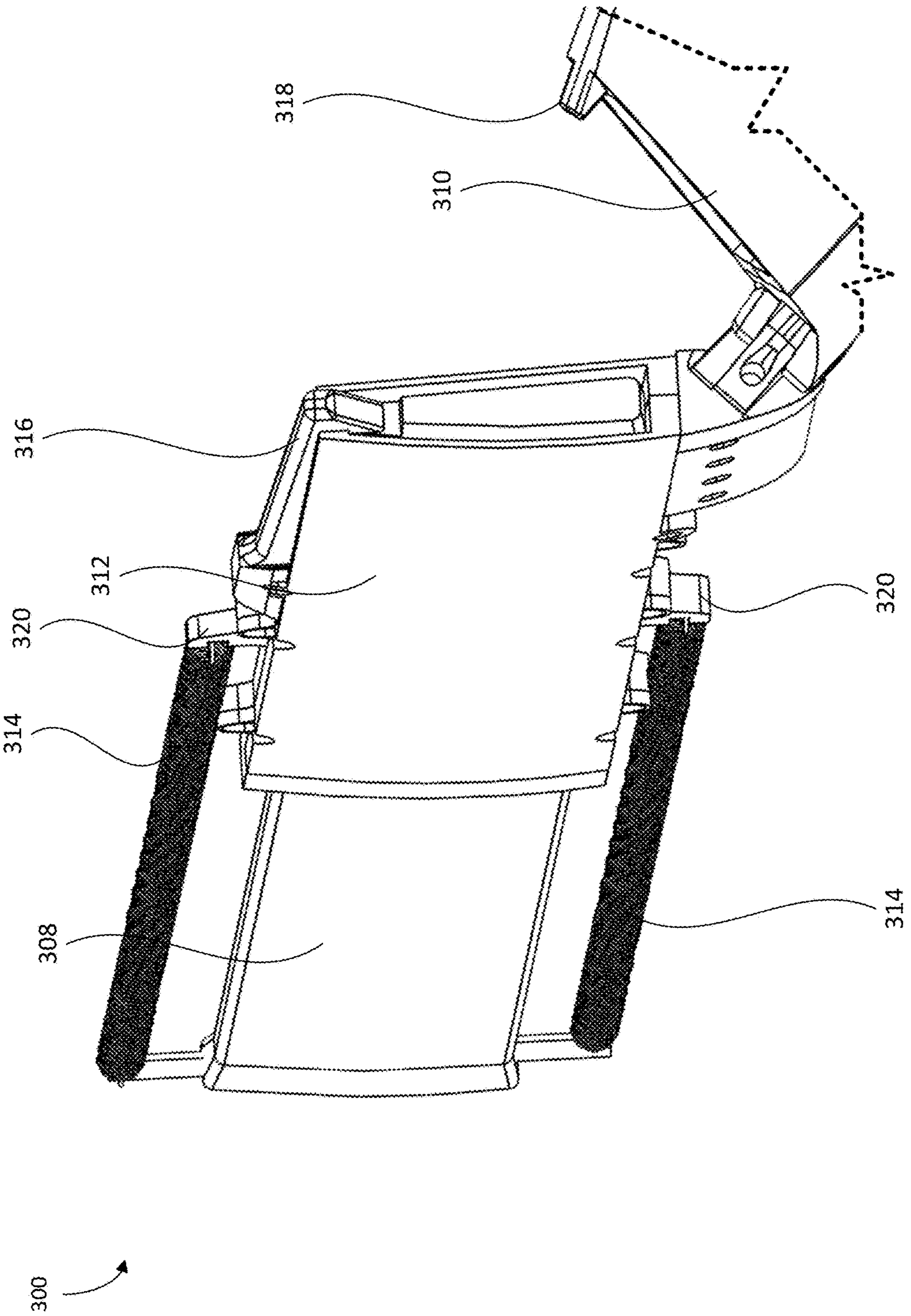
FIG. 13 illustrates a front perspective, partial detail view of the example mid-wing stiffening spar assembly of the wing shown in FIG. 11.

FIG. 13 shows the example mid-wing hinge assembly 300 in further detail. Two spar actuators 314 are connected to the movable spar 308 on a first end and are connected to the second channel 312 on a second end. In an example, the spar actuators 314 may be elastic members and may be fastened to the movable spar 308 and to the protrusion 320 on the second channel 312 such that the spar actuators 314 are in tension and provide a pushing force to move the movable spar 308 from the second channel 312 to a position between the second channel 312 and the first channel 310. The mid-wing hinge assembly 300 may further include a retention member 316 attached to the second channel 312 within the second wing segment 304. In an example, the spar actuators 314 may provide a constant pushing force on the movable spar 308 to move it from the second channel 312 to a position within both the second channel 312 and the first channel 310.

Figure 14:
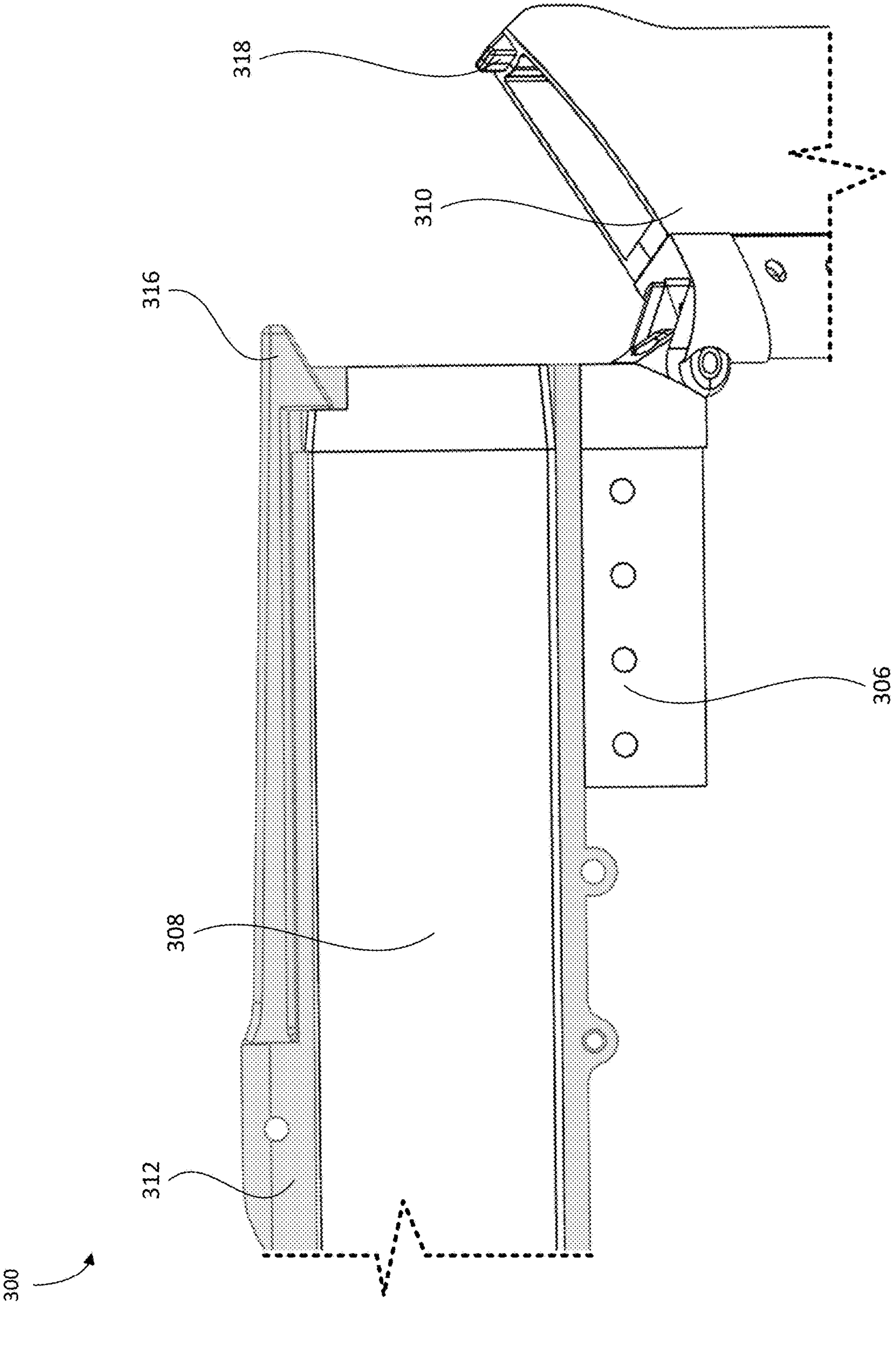
FIG. 14 illustrates a side elevation, partial detail view of the example mid-wing stiffening spar assembly of the wing shown in FIG. 11.

FIG. 14 is a side elevation and section view of the mid-wing hinge assembly 300, further showing additional details of the retention member 316 and a release member 318. Before the second wing segment 304 moves to a position that is substantially colinear with the first wing segment 302 by rotating about the hinge 306, the movable spar 308 is prevented from moving from the second channel 312 by the retention member 316. The retention member 316 prevents the movable spar 308 from prematurely moving before the second channel 312 aligns with the first channel 310 by geometry which opposes the force provided by the spar actuators 314 illustrated in FIG. 13.

Further illustrated in FIG. 14, the first channel 310 which is located inside of the first wing segment 302, may further have the release member 318 attached to the first channel 310. The release member 318 may have a geometry such that, when the second wing segment 304 aligns with the first wing segment 302, the release member 318 (which is attached to the first channel 310) may contact the geometry of the retention member 316. The geometry of the release member 318 may move the retention member 316 clear of the movable spar 308 to allow the movable spar 308 to move within the second channel 312 and first channel 310 once the channels are substantially aligned or colinear.

Figure 15:
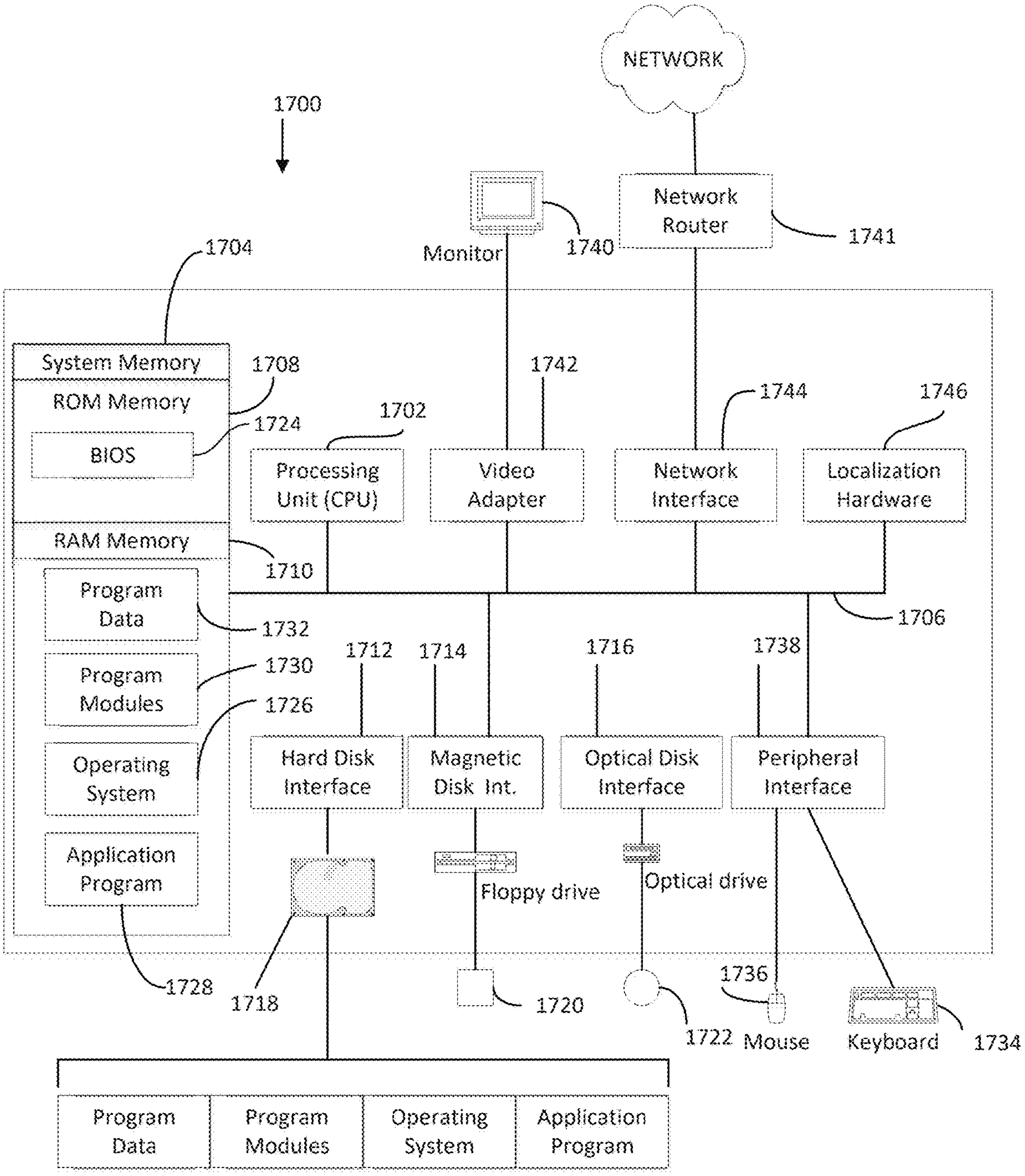
FIG. 15 is a block diagram of an example computing device, in accordance with one or more embodiments.

FIG. 15 is a block diagram of an example computing device 1700. A computing device 1700 is a desktop computer, laptop, smartphone, tablet, and/or any other electronic device having the ability to execute instructions, such as those stored within a non-transitory computer-readable medium. Furthermore, while described and illustrated in the context of a single computing device 1700, those skilled in the art will also appreciate that the various tasks described hereinafter may be practiced in a distributed environment having multiple computing devices 1700 linked via a local- or wide-area network in which the executable instructions may be associated with and/or executed by one or more of multiple computing devices 1700.

In its most basic configuration, the computing device 1700 includes at least one processing unit 1702 and at least one memory 1704 linked via a bus 1706. Depending on the exact configuration and type of computing device environment, memory 1704 is volatile (such as RAM 1710), non-volatile (such as ROM 1708, flash memory, etc.) or some combination of the two.

Computing device 1700 has additional features and/or functionality. For example, computing device 1700 may also include additional storage (removable and/or non-removable) including, but not limited to, magnetic or optical disks, tape drives and/or flash drives. Such additional memory devices may be made accessible to the computing device 1700 by means of, for example, a hard disk drive interface 1712, a magnetic disk drive interface 1714, and/or an optical disk drive interface 1716. As will be understood, these devices, which may be linked to the system bus 1706, respectively, allow for reading from and writing to a hard drive 1718, reading from or writing to a removable magnetic disk 1720, and/or for reading from or writing to a removable optical disk 1722, such as a CD/DVD ROM or other optical media. The drive interfaces and their associated computer-readable media may allow for the non-volatile storage of computer-readable instructions, data structures, program modules and other data for the computing device 1700. Those skilled in the art will further appreciate that other types of computer-readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer-readable (e.g., computer-implemented) instructions, data structures, program modules or other data. Any such computer storage media may be part of computing device 1700.

A number of program modules may be stored in one or more of the memory/media devices. For example, a basic input/output system (BIOS 1724), containing the basic routines that help to transfer information between elements within the computing device 1700, such as during start-up, may be stored in ROM 1708. Similarly, RAM 1710, hard drive 1718, and/or peripheral memory devices may be used to store computer-executable instructions comprising an operating system 1726, one or more applications programs 1728, other program modules 1730, and/or program data 1732. Still further, computer-executable instructions may be downloaded to the computing device 1700 as needed, for example, via a network connection. The applications programs 1728 may include, for example, computer programs for generating motion profiles, optimizing geometric parameters and/or kinematic constraints, performing exact and/or proximate synthesis, and any other functions previous described, for example, with respect to FIG. 3.

An end-user may enter commands and information into the computing device 1700 through input devices such as a keyboard 1734 and/or a pointing device 1736. While not illustrated, other input devices may include a microphone, a joystick, a game pad, a scanner, etc. These and other input devices would typically be connected to the processing unit 1702 by means of a peripheral interface 1738 which, in turn, would be coupled to bus 1706. Input devices may be directly or indirectly connected to processing unit 1702 via interfaces such as, for example, a parallel port, game port, firewire, or a universal serial bus (USB). To view information from the computing device 1700, a monitor 1740 or other type of display device may also be connected to bus 1706 via an interface, such as via video adapter 1742. In addition to the monitor 1740, the computing device 1700 may also include other peripheral output devices, not shown, such as speakers and printers.

The computing device 1700 may also utilize logical connections to one or more computing device environments. Communications between the computing device 1700 and the remote computing device environment may be exchanged via a further processing device, such as a network router 1741, that is responsible for network routing. Communications with the network router 1741 may be performed via a network interface component 1744. Thus, within such a networked environment, e.g., the Internet, wide area network (WAN), local area network (LAN), or other like type of wired or wireless network, it will be appreciated that program modules depicted relative to the computing device 1700, or portions thereof, may be stored in the memory storage device(s) of the computing device 1700.

The computing device 1700 may also include localization hardware 1746 for determining a location of the computing device 1700. In embodiments, the localization hardware 1746 may include, for example, a GPS antenna, an RFID chip or reader, a Wi-Fi antenna, or other computing hardware that may be used to capture or transmit signals that may be used to determine the location of the computing device 1700.

While this disclosure has described certain embodiments, it is understood that the claims are not intended to be limited to these embodiments except as explicitly recited in the claims. On the contrary, the instant disclosure is intended to cover alternatives, modifications, and equivalents, which may be included within the spirit and scope of the disclosure. Furthermore, in the detailed description of the present disclosure, numerous specific details are set forth in order to provide a thorough understanding of the disclosed embodiments. However, the subject technology is not limited to the specific details set forth herein and can be practiced using one or more other embodiments. In other instances, well known methods, procedures, components, and circuits have not been described in detail as not to unnecessarily obscure various aspects of the present disclosure. Additionally, in one or more embodiments, structures and components are shown in block diagram form to avoid obscuring the concepts of the subject technology.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It is understood, however, that these terms are to be interpreted as referencing physical manipulations and quantities and are merely convenient labels that should be interpreted further in view of terms commonly used in the art.

Unless specifically stated otherwise, as apparent from the discussion herein, it is understood that throughout discussions of the present embodiment, discussions utilizing terms such as “determining”, “outputting”, “transmitting”, “recording”, “locating”, “storing”, “displaying”, “receiving”, “recognizing”, “utilizing”, “generating”, “providing”, “accessing”, “checking”, “notifying”, “delivering”, or the like, refer to the action and processes of a computer system, or similar electronic computing device, that manipulates and transforms data. The data is represented as physical (electronic) quantities within the computer system’s registers and memories and is transformed into other data similarly represented as physical quantities within the computer system memories or registers, or other such information storage, transmission, or display devices as described herein or otherwise understood to one of ordinary skill in the art.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of any of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, one or more implementations, an embodiment, the embodiment, another embodiment, one or more implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations or one or more configurations. A disclosure relating to such phrase (s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject disclosure.

What is claimed is:

1. An apparatus for deploying wings of an aircraft, comprising:

a closed-loop mechanism comprising:
- a first member;
- a second member rotatably connected to the first member about a first rotational axis;
- a third member rotatably connected to the first member about a second rotational axis; and
- a fourth member pivotally connected to both the second member and the third member, wherein the fourth member kinematically constrains rotational movement of the second member and the third member in a nonlinear motion profile;

a first wing operatively connected to the second member; and a second wing operatively connected to the third member, wherein rotation of the second member and the third member in the nonlinear motion profile causes rotational deployment of the first wing and the second wing of the aircraft in accordance with the nonlinear motion profile.

2. The apparatus of claim 1, wherein the deployment rotation of the wings is symmetric.

3. The apparatus of claim 1, wherein the deployment rotation of the wings is asymmetric.

4. The apparatus of claim 1, further comprising a deployment actuator operatively connected to at least one member of the closed-loop mechanism;

wherein the deployment actuator causes a coordinated rotation of the second member and the third member via kinematic constraints of the fourth member of the closed-loop mechanism, thereby rotating the first wing and the second wing into a deployed position according to the nonlinear motion profile.

5. The apparatus of claim 4, further comprising a hinge flap;

wherein the first wing and the second wing meet at a mating profile, and rotation of the first wing and the second wing into the deployed position also moves the hinge flap over the mating profile.

6. The apparatus of claim 4, wherein the deployment actuator is any one of a shape memory alloy, motor, hydraulic piston, thermally actuated piston, a thermo-electrically activated piston, or electromagnetic piston and the deployment actuator comprises any one of an elastic member or a pulley.

7. The apparatus of claim 1, wherein the first wing and the second wing each further comprise:

a first wing segment;

a second wing segment; and a mid-wing hinge connecting the first wing segment and the second wing segment, wherein the mid-wing hinge is configured to allow the first wing segment to fold relative to the second wing segment in a non-deployed position.

8. The apparatus of claim 7, wherein the first wing and the second wing each further comprise a movable spar configured to move from a first position within the first wing segment or the second wing segment to a second position spanning the first wing segment and the second wing segment.

9. The apparatus of claim 1, wherein the nonlinear motion profile is determined through an approximate kinematic synthesis process using polynomial homotopy continuation to prevent collisions between the first wing and the second wing during deployment.

10. The apparatus of claim 9, wherein the approximate kinematic synthesis process determines the nonlinear motion profile constrained by at least one predefined ground pivot location.

11. An apparatus for deploying wings of an aircraft, comprising:

- a spherical four-bar mechanism comprising:
  - a first member;
  - a second member rotatably connected to the first member;
  - a third member rotatably connected to the first member; and
  - a fourth member pivotally connected to both the second member and the third member;
- a first wing operatively connected to the second member at a first point;
- a second wing operatively connected to the third member at a second point;
- a deployment actuator operatively connected to the fourth member of the spherical four-bar mechanism;
  - wherein the deployment actuator moves the fourth member of the spherical four-bar mechanism according to a nonlinear motion profile, in turn rotating the second member and the third member of the spherical four-bar mechanism, thereby rotating the first wing and the second wing into a deployed position whereby the first point and the second point meet at a mating profile; and
- a hinge flap, wherein rotation of the first wing and the second wing into the deployed position also moves the hinge flap over the mating profile.

12. The apparatus of claim 11, wherein the deployment actuator comprises any one of an elastic member or a pulley.

13. The apparatus of claim 11, wherein the deployment actuator is any one of a shape memory alloy, motor, hydraulic piston, thermally actuated piston, thermo-electrically activated piston, or electromagnetic piston.

14. The apparatus of claim 11, wherein the first wing and the second wing each further comprise;

- a first wing segment;
- a second wing segment; and
- a mid-wing hinge connecting the first wing segment and the second wing segment, wherein the mid-wing hinge is configured to allow the first wing segment to fold relative to the second wing segment in a non-deployed position.

15. The apparatus of claim 14, wherein the first wing and the second wing each further comprise a movable spar configured to move from a first position within the first wing segment or the second wing segment to a second position spanning the first wing segment and the second wing segment.

16. The apparatus of claim 11, wherein the nonlinear motion profile is determined through an approximate kinematic synthesis process using polynomial homotopy continuation to prevent collisions between the first wing and the second wing during deployment.

17. A non-transitory, computer-readable medium storing instructions that, when executed by a computing device, cause the computing device to perform operations comprising:

- determining kinematic constraints of a closed-loop mechanism, the closed-loop mechanism comprising:
  - a first member;
  - a second member rotatably connected to the first member;
  - a third member rotatably connected to the first member; and
  - a fourth member pivotally connected to the second member and the third member such that the fourth member kinematically constrains rotation motion of the second member and the third member;
- generating a motion profile based on geometric parameters of a first wing and a second wing and the kinematic constraints of the closed-loop mechanism, wherein:
  - each wing is coupled to a respective member of the closed-loop mechanism;
  - the motion profile defines a synchronized deployment trajectory for the first wing and the second wing; and
  - the motion profile includes a deviation from a target trajectory; and
- optimizing the geometric parameters and the kinematic constraints by minimizing the deviation of the motion profile from the target trajectory.

18. The non-transitory, computer-readable medium of claim 17, wherein generating the motion profile is through an approximate kinematic synthesis process using polynomial homotopy continuation to prevent collisions between the first wing and the second wing during deployment.

19. The non-transitory, computer-readable medium of claim 18, wherein the approximate kinematic synthesis process generates the motion profile constrained by at least one predefined ground pivot location.

20. The non-transitory, computer-readable medium of claim 17, wherein optimizing the geometric parameters and the kinematic constraints account for at least one of mechanical interference between the first wing and the second wing, force used to actuate the closed-loop mechanism, and deployment timing constraints.

* * * * *